United States Patent
Seo

(10) Patent No.: US 7,532,056 B2
(45) Date of Patent: May 12, 2009

(54) ON CHIP TEMPERATURE DETECTOR, TEMPERATURE DETECTION METHOD AND REFRESH CONTROL METHOD USING THE SAME

(75) Inventor: Young-Hun Seo, Gyeonggi-do (KR)

(73) Assignee: Samsung Electronics Co., Ltd., Suown-si, Gyeonggi-do (KR)

( * ) Notice: Subject to any disclaimer, the term of this patent is extended or adjusted under 35 U.S.C. 154(b) by 347 days.

(21) Appl. No.: 11/459,312

(22) Filed: Jul. 21, 2006

(65) Prior Publication Data
US 2007/0098041 A1 May 3, 2007

(30) Foreign Application Priority Data
Aug. 10, 2005 (KR) ............... 10-2005-0073397

(51) Int. Cl.
*H03K 3/42* (2006.01)
(52) U.S. Cl. ............... 327/512; 327/513; 327/540; 323/907
(58) Field of Classification Search ......... 327/512, 327/513, 538–540; 323/314–316, 907
See application file for complete search history.

(56) References Cited

U.S. PATENT DOCUMENTS 6,078,208 A * 6/2000 Nolan et al. ............... 327/512
6,320,809 B1 * 11/2001 Raad ........................ 365/226
6,348,832 B1 * 2/2002 Chih ........................ 327/538
7,161,440 B2 * 1/2007 Meltzer ..................... 331/76
7,315,792 B2 * 1/2008 Min et al. .................. 702/130
2005/0001596 A1 1/2005 Lovett

FOREIGN PATENT DOCUMENTS

| JP | 2003-132678 | 5/2003 |
| KR | 2004-0048750 | 6/2004 |
| KR | 2004-0087152 | 10/2004 |

OTHER PUBLICATIONS

English language abstract of Korean Publication No. 2004-0048750.
English language abstract of Korean Publication No. 2004-0087152.
English language abstract of Japanese Publication No. 2003-132678.

* cited by examiner

*Primary Examiner*—An T Luu
(74) *Attorney, Agent, or Firm*—Marger Johnson & McCollom, P.C.

(57) ABSTRACT

A temperature sensor includes a proportional to absolute temperature (PTAT) current generator configured to generate a first current proportional to temperature, a first complementary to absolute temperature (CTAT) current generator configured to generate a second current inversely proportional to temperature, a second CTAT current generator configured to generate a third current inversely proportional to temperature, and a temperature sensing unit configured to convert the first current, the second current, and the third current into a signal related to the temperature.

62 Claims, 17 Drawing Sheets

ON CHIP TEMPERATURE DETECTOR, TEMPERATURE DETECTION METHOD AND REFRESH CONTROL METHOD USING THE SAME

CROSS-REFERENCE TO RELATED PATENT APPLICATION

This application claims the benefit of Korean Patent Application No. 10-2005-0073397, filed on Aug. 10, 2005, in the Korean Intellectual Property Office, the disclosure of which is incorporated herein in its entirety by reference.

BACKGROUND OF THE INVENTION

1. Field of the Invention

This disclosure relates to a semiconductor memory device, and more particularly, to an on-chip temperature detector linearly detecting a sensed temperature, a temperature detecting method thereof, and a refresh control method using the same.

2. Description of the Related Art

In general, a semiconductor device has operating characteristics that depend on temperature. As shown in FIG. 1, typical operating characteristics of the semiconductor device include a supply current IDD and an access time tACCESS. The access time increases (A) as temperature increases, and the supply current IDD increases (B) as temperature decreases.

Temperature dependent characteristics such as these are important for volatile memory devices such as DRAMs. Leakage currents in DRAMs increases as temperature increases. This deteriorates a data sustain characteristic, reducing a data sustain time tST. Accordingly, as temperature increases the DRAM requires more frequent refresh operations.

The development of electronic technologies has enabled the design and cost-effective manufacture of portable electronic devices. Such portable electronic devices include pagers, cellular phones, music players, calculators, lap-top computers, PDAs, and so on. The portable electronic devices generally require DC power, and thus, one or more batteries are used as an energy source to supply the DC power to the portable electronic devices.

In a battery-operated system, it is important to reduce the power consumption. To achieve this, circuit components included in the system are turned off during a sleep mode used for power saving. However, a DRAM included in the system should continuously refresh data stored in DRAM cells in order to preserve the data.

One of the attempts to reduce power consumed in the DRAM is to vary a refresh period with temperature. In FIG. 1, when the refresh period is increased to reduce a refresh clock frequency in a low temperature region where consumption current is increased power consumption is decreased. Accordingly, a temperature detector for detecting the internal temperature of the DRAM is required.

FIG. 2 is a circuit diagram of a conventional temperature detector 200. Referring to FIG. 2, the temperature detector 200 includes a proportional to absolute temperature current generator (referred to as "PTAT current generator" hereinafter) 210, a complementary to absolute temperature current generator (referred to as "CTAT current generator" hereinafter) 220, and a comparator 230.

The PTAT current generator 210 includes first and second PMOS transistors MP1 and MP2, first and second NMOS transistors MN1 and MN2, a resistor R, and first and second diodes D1 and D2. The first and second PMOS transistors MP1 and MP2 have the same size and form a first current mirror. The first and second NMOS transistors MN1 and MN2 have the same size and form a second current mirror. The sizes of the first and second diodes D1 and D2 have the ratio of 1:M.

Since the input and the output of the first current mirror formed by the first and second PMOS transistors MP1 and MP2 and the output and the input of the second current mirror formed by the first and second NMOS transistors MN1 and MN2 are respectively connected to each other, a current $Ia_1$ and a current $Ia_2$ are identical to each other. The ratio of $Ia_1$ to $Ia_2$ is 1:1.

In general, a turn-on current ID of a diode is as follows.

$$ID = Is*(e^{VD/VT}-1) \approx Is*(e^{VD/VT})$$ [Equation 1]

Is represents reverse saturation current of the diode, VD is a diode voltage, and VT is a temperature voltage represented by kT/q. Where T is the temperature, k is a constant and q is the change of an electron. Accordingly, the current $Ia_1$ flowing through the first diode D1 is as follows:

$$Ia1 = Is*(e^{VD1/VT})$$ [Equation 2]

The first diode voltage VD1 is as follows:

$$VD1 = VT*\ln(Ia1/Is)$$ [Equation 3]

The second diode voltage VD2 is as follows:

$$VD2 = VT*\ln(Ia2/(Is*M))$$ [Equation 4]

Since the current $Ia_1$ and the current $Ia_2$ are identical to each other, the first diode voltage VD1 and current temperature voltage NOC0 becomes almost identical to each other. Accordingly, the following equation is obtained:

$$V(NOC0) = VD1 = VD2 + Ia2*R$$ [Equation 5]

When VD1 and VD2 of Equation 5 are replaced with Equations 3 and 4, respectively, the following equation is obtained:

$$VT*\ln(Ia1/Is) = VT*\ln(Ia2/(Is*M)) + Ia2*R$$ [Equation 6]

Accordingly, the current $Ia_1$ is as follows.

$$Ia2 = VT*\ln(M)/R$$ [Equation 7]

Thus, the current Ia1 is proportional to temperature. That is, the PTAT current generator 210 generates the current $Ia_1$ proportional to the temperature of the PTAT current generator 210.

The CTAT current generator 220 includes a third PMOS transistor MP3, a third NMOS transistor MN3, a plurality of resistors Raa, RU1 through RU5, and RD1 through RD5, and a plurality of switching transistors TU1 through TU5 and TD1 through TD5.

The switching transistors TU1 through TU5 and TD1 through TD5 are selectively turned on/off in response to trip temperature control signals AU1 through AU5 and AD1 through AD5.

The resistors RU1 through RU5 and RD1 through RD5 are respectively connected to the switching transistors TU1 through TU5 and TD1 through TD5 Accordingly, any switching transistors TU1 through TU5 and TD1 through TD5 that are turned on short circuit the respective resistors PU1 through RU5 and RD1 through RD5.

If the current $Ia_1$ and current $Ia_2$ are almost identical to one another, a VA node voltage and VB node voltage of the PTAT current generator 210, and a VC node voltage of the CTAT current generator 220 become almost identical to one another. In Equations 3 and 4, the voltage VT is increased as temperature is increased. However, the current Is is also increased. As a result, the diode voltage is reduced as temperature is increased and hence the node voltages VA and VC are decreased. Accordingly, the current Ib flowing through the resistors Raa, RU1 through RU5 and RD1 through RD5 is decreased as temperature is increased. Thus, the CTAT current generator 220 generates a current that varies inversely proportional to temperature.

The comparator 230 compares the current temperature voltage NOC0 to a sensed temperature voltage NOC1. The current temperature voltage NOC0 and sensed temperature voltage NOC1 are determined by the current $Ia_1$ and current $Ib_1$, respectively. When the point at which the current $Ia_1$ becomes identical to the current $Ib_1$ is found, as shown in FIG. 3, based on the current temperature voltage NOC0 and sensed temperature voltage NOC1, the temperature detector 200 detects the current temperature.

Referring to FIG. 3, consider a target temperature of the temperature detector 200 of 45° C. When the current Ib is smaller than the current $Ia_1$, the trip temperature control signals AU1 through AU5 and AD1 through AD5 of the CTAT current generator 220 are selectively enabled to decrease the resistance value of the CTAT current generator 220 such that the current Ib is increased, as shown by direction (C), to make the current $Ia_1$ identical to the current Ib. In contrast, when the current Ib is larger than the current $Ia_1$, the trip temperature control signals AU1 through AU5 and AD1 through AD5 of the CTAT current generator 220 are selectively disabled to increase the resistance value of the CTAT current generator 220 such that the current Ib is decreased, as shown by direction (D), to make the current $Ia_1$ identical to the current Ib.

When the current $Ia_1$ becomes identical to the current Ib at the target temperature, 45° C., the comparator 230 outputs a signal having alternating logic levels of high-low-high-low. Accordingly, the temperature detector 200 detects the current temperature, 45° C.

The temperature detector 200 controls the trip temperature control signals AU1 through AU5 and AD1 through AD5 to adjust the resistance value of the resistor branch of the CTAT current generator 220 to change the sensed temperature, that is, the current Ib. When the resistance value is controlled, a gradient of the sensed temperature is not uniform due to the variation of the resistance value. Accordingly, the gradient of the sensed temperature is non-linear. Furthermore, the temperature detector 200 detects the current temperature of a chip based on a single target temperature, and thus the target temperature is fixed to one value.

SUMMARY OF THE INVENTION

An embodiment includes a temperature sensor including a proportional to absolute temperature (PTAT) current generator configured to generate a first current proportional to temperature, a first complementary to absolute temperature (CTAT) current generator configured to generate a second current inversely proportional to temperature, a second CTAT current generator configured to generate a third current inversely proportional to temperature, and a temperature sensing unit configured to convert the first current, the second current, and the third current into a signal related to the temperature.

Another embodiment includes a temperature detection method for a semiconductor device including generating a first current proportional to temperature, generating a second current inversely proportional to temperature, generating a third current inversely proportional to temperature, and converting the first current, the second current, and the third current into a signal related to the temperature.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION OF THE INVENTION

Figure 1:
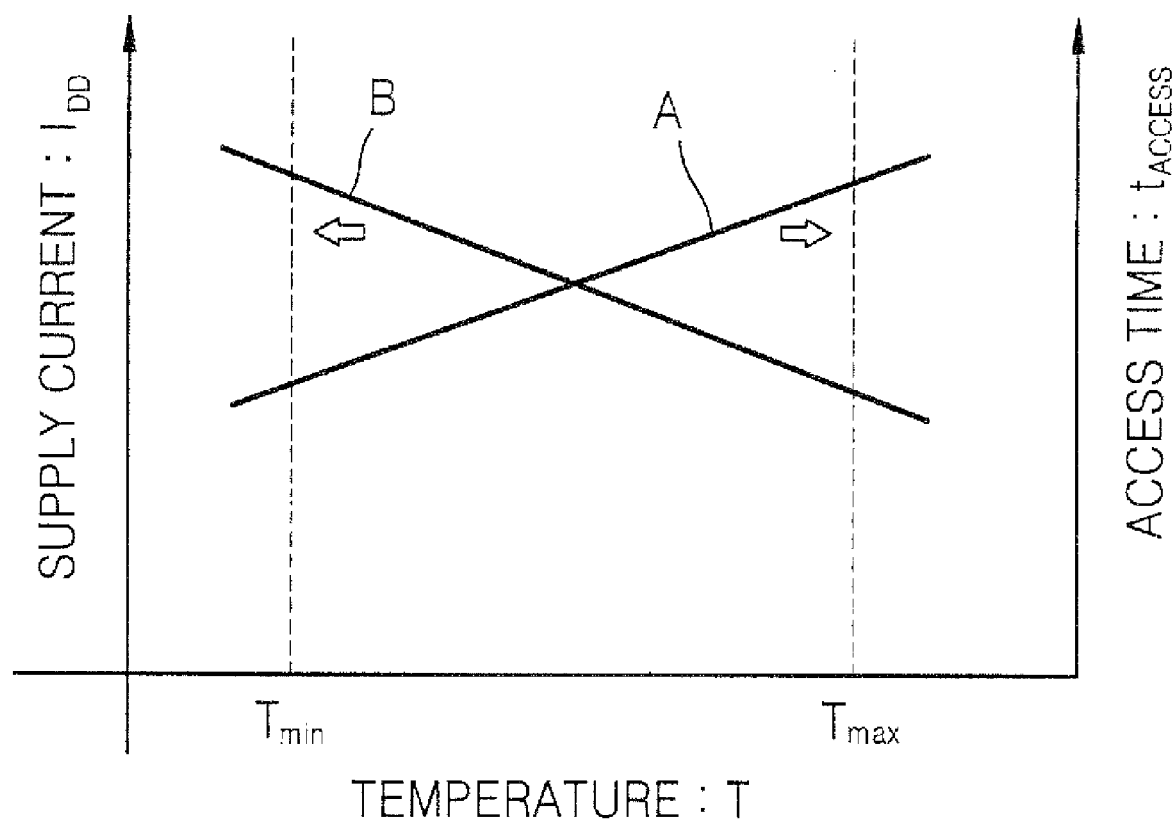
FIG. 1 is a graph showing temperature characteristic of a semiconductor device.

Embodiments will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art, Throughout the drawings, like reference numerals refer to like elements.

Figure 4:
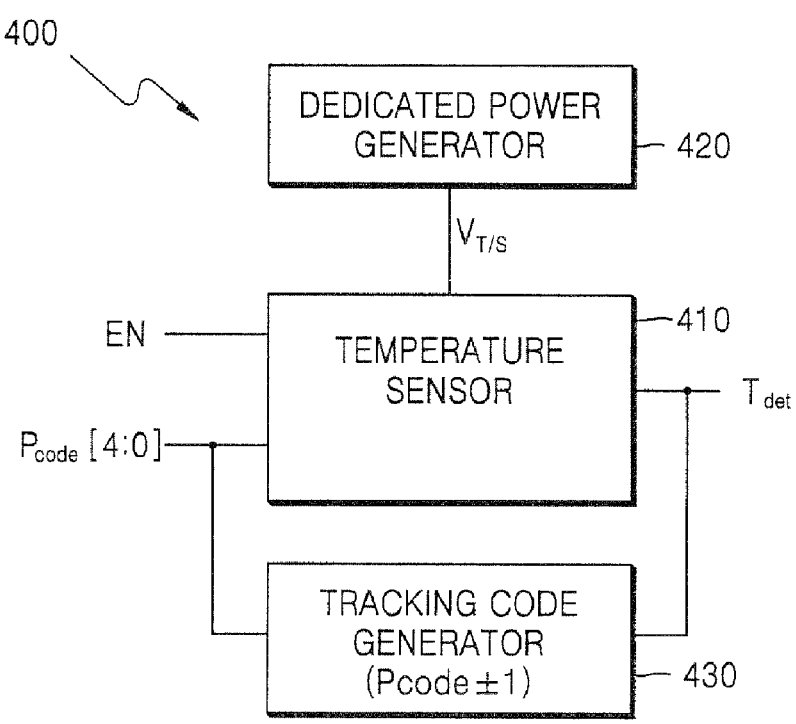
FIG. 4 is a block diagram of a temperature detector according to an embodiment.

FIG. 4 is a block diagram of a temperature detector 400 according to an embodiment. Referring to FIG. 4, the temperature detector 400 includes a temperature sensor 410, a power generator 420 dedicated to the temperature sensor 410, and a tracking code generator 430. The temperature detector 400 detects the current temperature of a chip using a two-corner test using a high temperature and a low temperature. The high temperature may be set to 100° C., for example, and the low temperature may be set to 0° C., for example. The dedicated power generator 420 provides a power supply voltage $V_{T/S}$ dedicated to the temperature sensor 410. The tracking code generator 430 varies a tracking code Pcode[0:n]. The tracking code Pcode[0:n] may change by ±1 in one example.

The temperature sensor 410 generates a temperature detection signal Tdet in response to a temperature sensor enable signal EN and the tracking code Pcode[0:n]. The tracking code Pcode[0:n] may have 5 bits where n=4, for example. Such a tracking code Peode[0:n] with 5 bits may be referred to as a tracking code Pcode[0:4]. The tracking code Pcode[0:4] may be initially set to "11111". If using high and low temperatures of 100° C. and 0° C., respectively, the tracking code "11111" is a reference code used to represent an actual temperature of 100° C. Similarly, "00000" is a reference code used to represent an actual temperature of 0° C.

The temperature sensor 410 generates the temperature detection signal Tdet in response to the temperature sensor enable signal EN. The temperature detection signal Tdet corresponds to the result of comparison of the current temperature of the chip including the temperature detector 400 and the temperature sensed by the temperature sensor 410. The temperature detection signal Tdet at a logic low or high level.

Assuming that the current tracking code Pcode[0:n] is "11101", when the temperature detection signal Tdet is at a logic high level, that is, when the temperature sensed by the temperature sensor 410 is lower than the current temperature of the chip, the tracking code Pcode[0:n] is increased by 1 to be set to "11110" to increase the sensed temperature of the temperature sensor 410. The temperature sensor 410 generates the temperature detection signal Tdet in response to the tracking code "11110". This operation is repeated until the temperature detection signal Tdet is output as a logic low signal. At that point, the temperature sensor 410 stores the tracking code Pcode[0:4]. If using a 100° C. temperature range as described above, the sensed temperature of the temperature sensor 410 is increased by $$\frac{100}{2^5-1} \circ C.$$

whenever the tracking code Pcode[0:4] is increased by 1.

Alternatively, when the temperature detection signal Tdet of the temperature sensor 410 is at a logic low level, that is, when the sensed temperature of the temperature sensor 410 is higher than the current temperature of the chip, a first temperature code Pcode[0:4] is decreased by 1. For example, if the tracking code Pcode[0:4] stored in the temperature sensor 410 is "10001", the tracking code Pcode[0:4] will be set to "10000". The temperature sensor 410 generates the temperature detection signal in response to the new tracking code "10000". This operation is repeated until the temperature detection signal Tdet is output as a logic high level. At that point, the temperature sensor 410 stores the tracking code Pcode[0:n]. If using a 100° C. temperature range as described above, the sensed temperature of the temperature sensor 410 is decreased by $$\frac{100}{2^5-1} \circ C.$$

whenever the tracking code Pcode[0:n] is decreased by 1.

Figure 5:
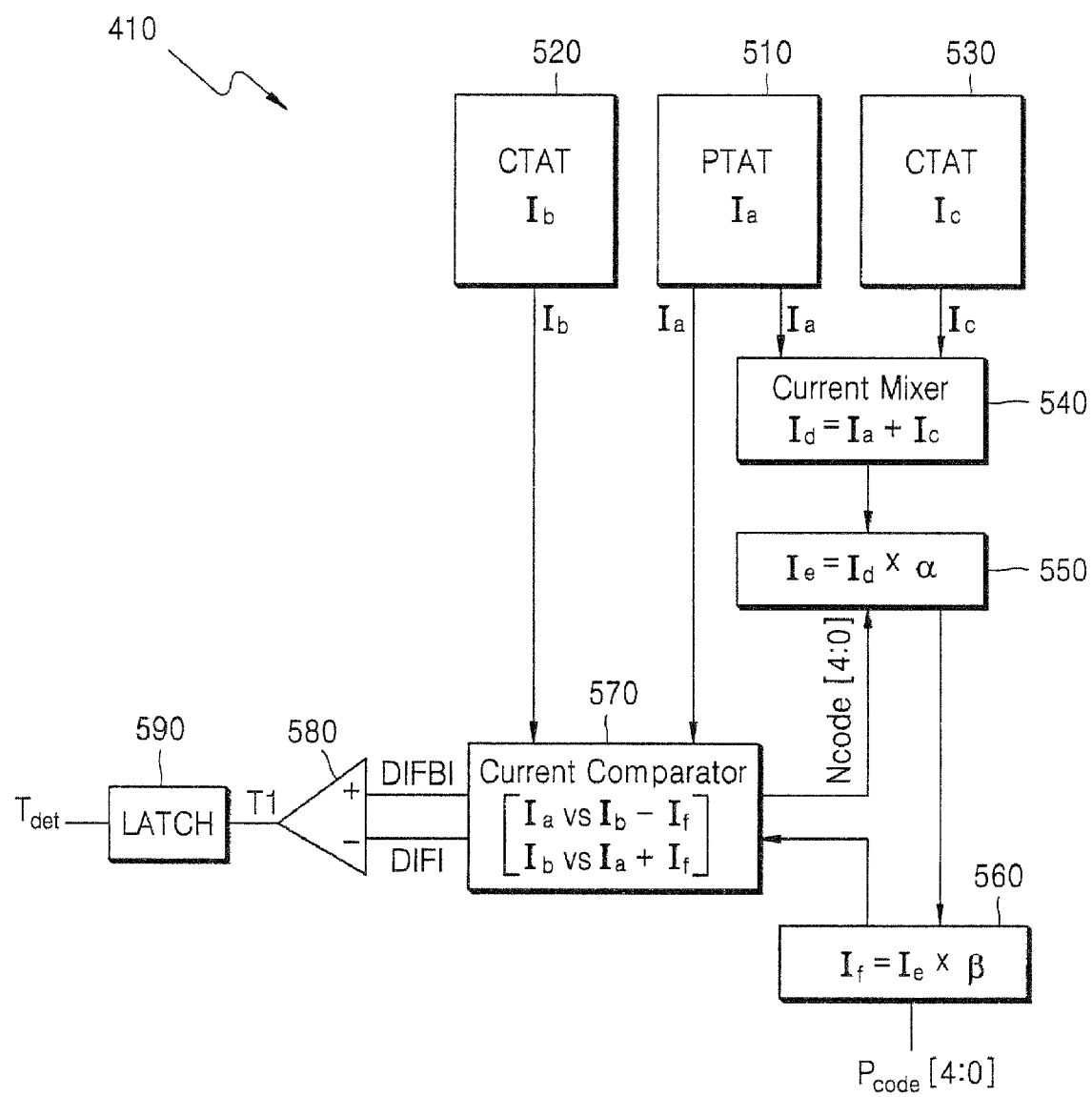
FIG. 5 is a block diagram of a temperature sensor of FIG. 4.

FIG. 5 is a block diagram of the temperature sensor 410 of FIG. 4. Referring to FIG. 5, the temperature sensor 410 includes a PTAT current generator 510, first and second CTAT current generators 520 and 530, a current mixer 540, a first current multiplier 550, a second current multiplier 560, a current comparator 570, a differential amplifier 580, and a latch 590.

The PTAT current generator 510 generates a current Ia proportional to temperature. The first CTAT current generator 520 generates a current Ib inversely proportional to temperature. The second CTAT current generator 530 generates a current Ic having a gradient corresponding to the inverse of the gradient of current Ia. The current mixer 540 sums up the current Ia and current Ic to generate a current Id. The first current multiplier 550 multiplies the current Id by α to generate a current Ie in response to a test code Ncode[0:4].

The second current multiplier 560 multiplies the current Ie by β to generate a current If in response to the tracking code Pcode[0:n]. The current comparator 570 compares the current Ia to the current Ib using the current If to generate a first differential input voltage OIFB1 and a second differential input voltage DIF1. The differential amplifier 580 compares and amplifies the first and second differential input voltages DIFB1 and DIF1, to generate a differential output signal T1. The latch 590 latches the differential output signal T1 to generate the temperature detection signal Tdet.

Figure 2:
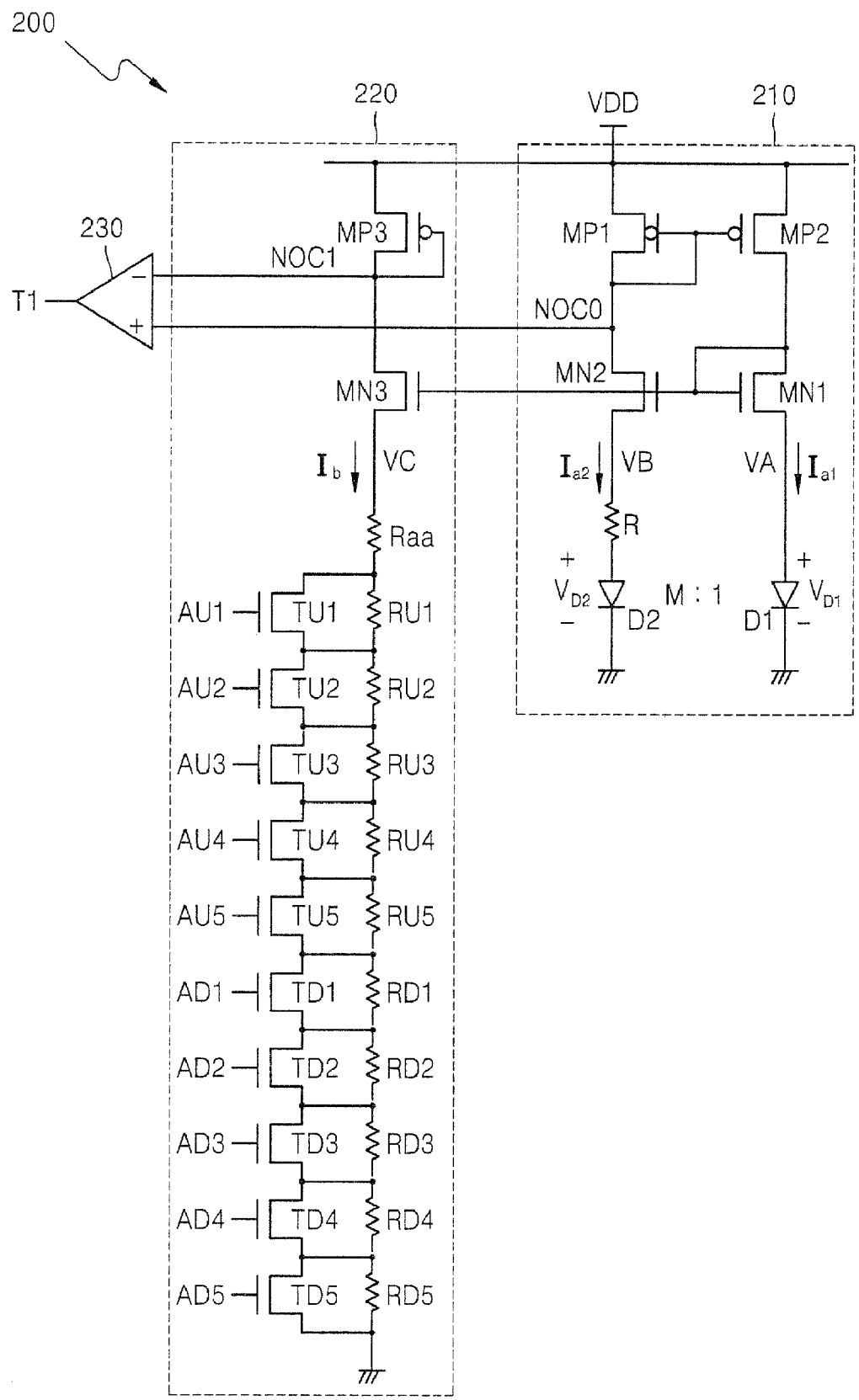
FIG. 2 is a circuit diagram of a conventional temperature detector.
Figure 3:
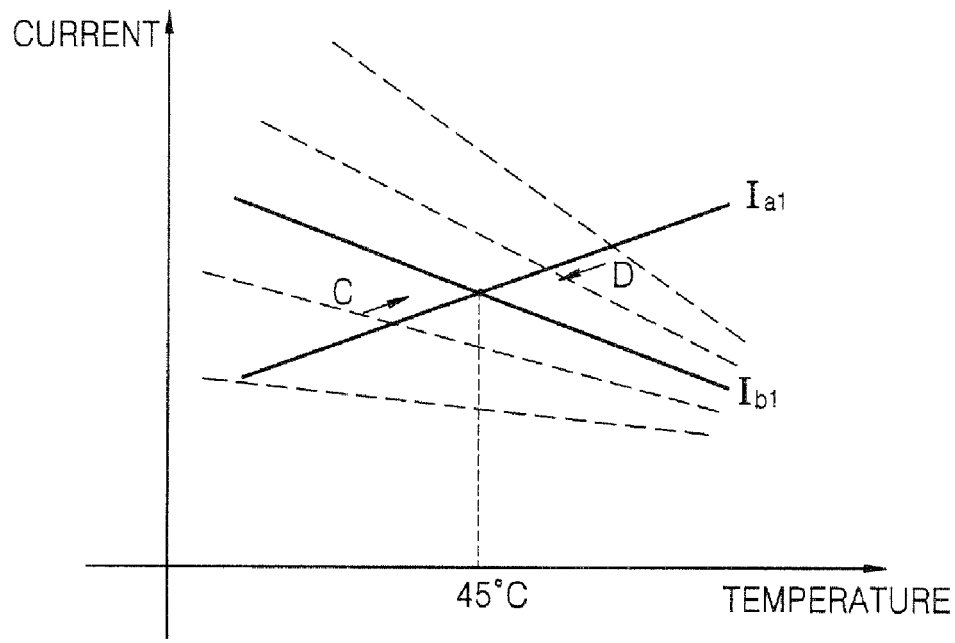
FIG. 3 is a graph for explaining characteristic of the temperature detector of FIG. 2.
Figure 6:
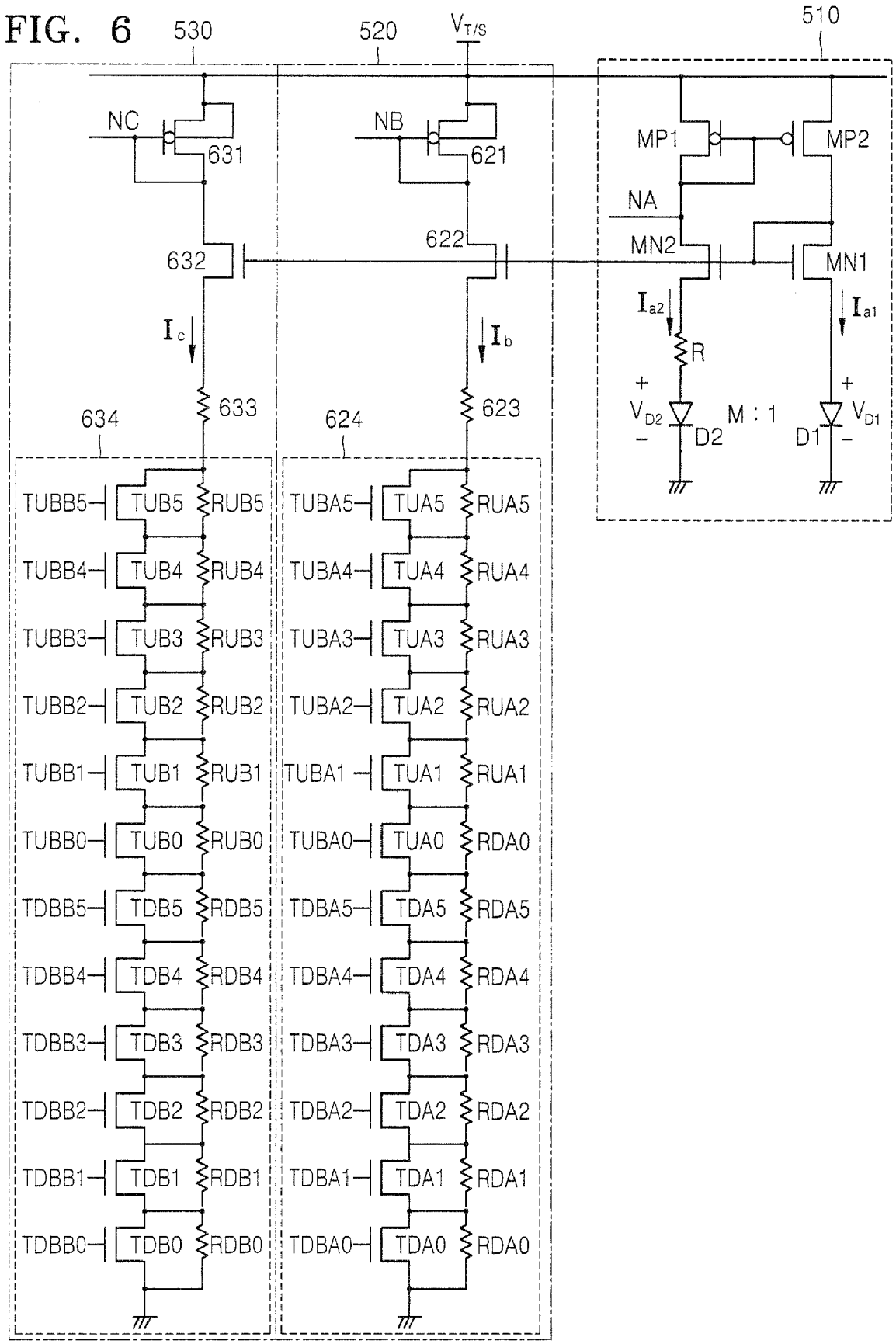
FIG. 6 is a circuit diagram of a PTAT current generator and first and second CTAT current generators of FIG. 5.

FIG. 6 is a circuit diagram of the PTAT current generator 510 and the first and second CTAT current generators 520 and 530 of FIG. 5. Referring to FIG. 6, the PTAT current generator 510 is identical to the PTAT current generator 210 of FIG. 2. The PTAT current generator 510 generates the current Ia proportional to temperature and generates a first node voltage NA at the gate and drain of the first PMOS transistor MP1 according to the current Ia. Detailed explanation for the PTAT current generator 51 0 is omitted because it is identical to the PTAT current generator 210 of FIG. 2.

The first CTAT current generator 520 includes a PMOS transistor 621, an NMOS transistor 622, a resistor 623, and a resistor branch 624 serially coupled between a power supply voltage $V_{T/S}$ and a ground voltage Vss. The PMOS transistor 621 has a gate and a drain, coupled to each other. The resistor branch 624 has a resistance value varied by transistors turned on in response to first control signals TUBA0 through TUBA5 and TDBA0 through TDBA5. The first CTAT current generator 520 generates the current Ib inversely proportional to temperature, and generates a second node voltage NB at the gate and drain of the PMOS transistor 621 according to the current Ib.

The second CTAT current generator 530 includes a PMOS transistor 631, an NMOS transistor 632, a resistor 633 and a resistor branch 634 serially coupled between the power supply voltage $V_{T/S}$ and the ground voltage Vss. The PMOS transistor 631 has a gate and a drain coupled to each other. The resistor branch 634 has a resistance value varied by transistors turned on in response to second control signals TUBB0 through TUBB5 and TDBB0 through TDBB5. The second CTAT current generator 530 controls the resistance value of the resistor branch 634 to generate the current Ic having a gradient versus temperature corresponding to the inverse of the gradient of the current Ia versus temperature.

Figure 7:
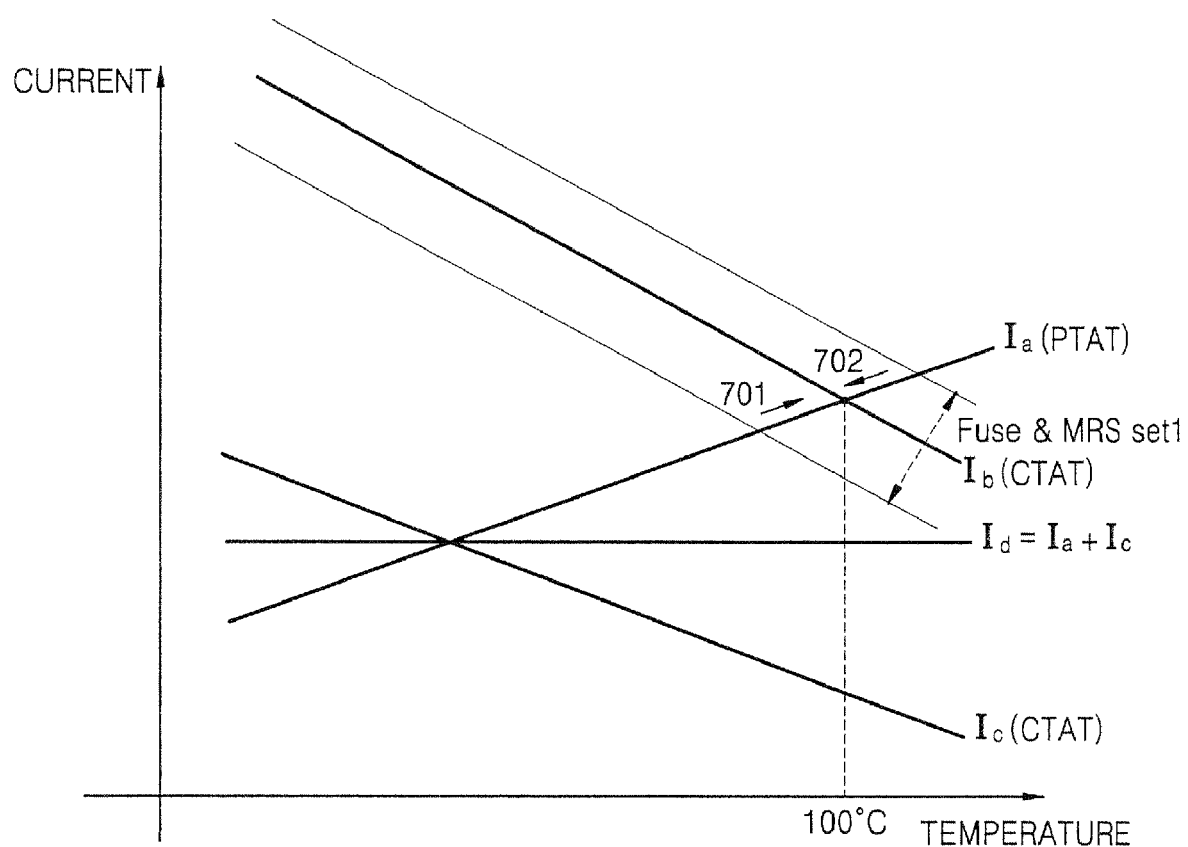
FIG. 7 is a graph showing temperature characteristics of the PTAT current generator and the first and second CTAT current generators shown in FIG. 6.

FIG. 7 is a graph showing temperature characteristics of the PTAT current generator 510 and the first and second CTAT current generators 520 and 530 shown in FIG. 6. Referring to FIG. 7, the current Ia is proportional to temperature and the current Ib is inversely proportional to temperature.

The current Ib can be identical to, smaller than or larger than the current Ia when the current temperature is 100° C. When the current Ib is smaller than the current Ia, the first control signals TUBA0 through TUBA5 and TDBA0 through TDBA5 are selectively enabled to short-circuit corresponding resistors of the resistor branch 624. Accordingly, the resistance value of the resistor branch 624 is decreased, and thus the current Ib is increased (701). This operation is repeated to detect the point at which the current Ib becomes identical to the current Ia.

When the current Ib is larger than the current Ia, the first control signals TUBA0 through TUBA5 and TDBA0 through TDBA5 are selectively disabled to increase the resistance value of the resistor branch 624. Accordingly, the current Ib is decreased (702). This operation is repeated to detect the point at which the current Ib becomes identical to the current Ia.

The state of first control signals TUBA0 through TUBA5 and TDBA0 through TDBA5 that makes Ib equal to Ia is stored in a first mode register. Alternatively, the resistor branch 624 can be selectively fuse-trimmed to set the state of the first control signals TUBA0 through TUBA5 and TDBA0 through TDBA5.

The current Ic has the gradient versus temperature corresponding to the inverse of the gradient of the current Ia versus temperature. The current mixer 540 sums up the current Ia and the current Ic to generate the current Id. The current Id has a specific value with respect to temperature. In other words, the current Id is independent of a temperature variation. The temperature sensor 410 detects a sensed signal using the current Id. Preferably, the current Id may be measured from the outside of the chip.

Figure 8:
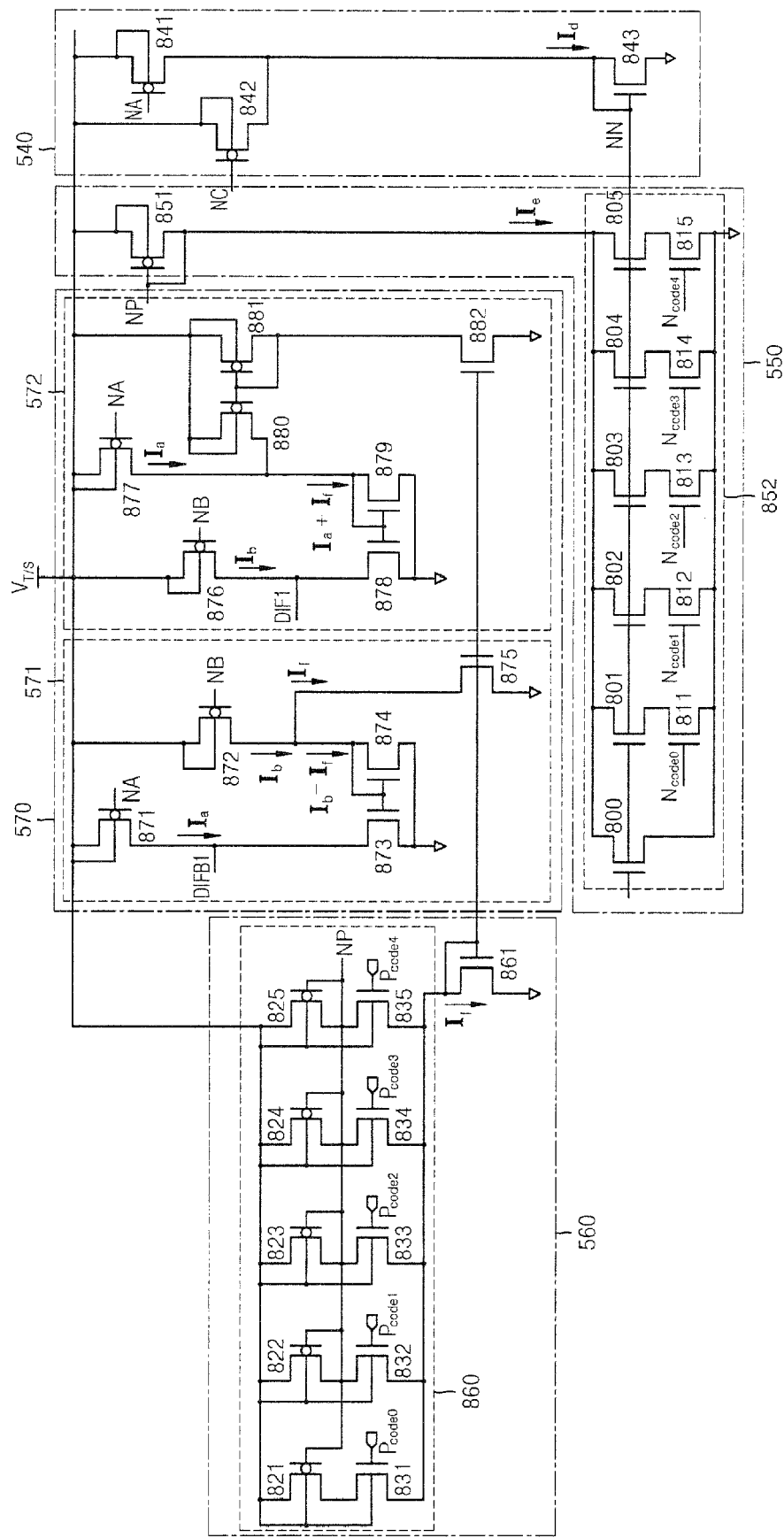
FIG. 8 is a circuit diagram of a current mixer, a first current multiplier, a second current multiplier and a current comparator of FIG. 5.

FIG. 8 is a circuit diagram of the current mixer 540, the first current multiplier 550, the second current multiplier 560 and the current comparator 570 of FIG. 5. Referring to FIG. 8, the current mixer 540 includes a first PMOS transistor 841 having a source coupled to the power supply voltage $V_{T/S}$ and a gate coupled to the first node voltage NA, a second PMOS transistor 842 having a source coupled to the power supply voltage $V_{T/S}$ and a gate coupled to a third node voltage NC, and an NMOS transistor 843 having a gate and a drain, which are coupled to the drains of the first and second PMOS transistors 841 and 842, and a source coupled to the ground voltage Vss.

The first PMOS transistor 841 forms a current mirror with the first PMOS transistor MP1 of the PTAT current generator 510. The current Ia flows through the first PMOS transistor 841. The second PMOS transistor 842 forms a current mirror with the PMOS transistor 631 of the second CTAT current generator 630. The current Ic flows through the second PMOS transistor 842. The current Id corresponding to the sum of the current Ia and current Ic flows to the NMOS transistor 843. The current Id generates a fourth node voltage NN at the gate and drain of the NMOS transistor 843.

The first current multiplier 550 includes a PMOS transistor 851 having a source coupled to the power supply voltage $V_{T/S}$, a gate and a drain coupled to each other, and a first current controller 852 that is coupled between the drain of the PMOS transistor 851 and the ground voltage Vss and controls the current Ie in response to the test code Ncode[0:4].

The first current controller 852 includes multiple current paths between the drain of the PMOS transistor 851 and the ground voltage Vss. A first current path includes a first NMOS transistor 800 having a gate to receive the fourth node voltage NN. The first NMOS transistor 800 forms a current mirror with the NMOS transistor 843 of the current mixer 540 such that a current Id' corresponds to the current Id multiplied by a predetermined factor.

The second current path includes a second NMOS transistor 801 having a gate to receive the fourth node voltage NN and a third NMOS transistor 811 having a gate to receive a code Ncode0. The second NMOS transistor 801 forms a current mirror with the NMOS transistor 843 of the current mixer 540 such that a current one times the current Id' flows through the second NMOS transistor 801.

The third current path includes a fourth NMOS transistor 802 having a gate to receive the fourth node voltage NN and a fifth NMOS transistor 812 having a gate to receive a code Ncode1. The fourth NMOS transistor 802 forms a current mirror with the NMOS transistor 843 of the current mixer 540 such that a current two times the current Id' flows through the fourth NMOS transistor 802.

The fourth current path includes a sixth NMOS transistor 803 having a gate to receive the fourth node voltage NN and a seventh NMOS transistor 813 having a gate to receive a code Ncode2. The sixth NMOS transistor 803 forms a current mirror with the NMOS transistor 843 of the current mixer 540 such that a current four times the current Id' flows through the sixth NMOS transistor 803.

The fifth current path includes an eighth NMOS transistor 804 having a gate to receive the fourth node voltage NN and a ninth NMOS transistor 814 having a gate to receive a code Ncode3. The eighth NMOS transistor 804 forms a current mirror with the NMOS transistor 843 of the current mixer 540 such that a current eight time the current Id' flows through the eighth NMOS transistor 804.

The sixth current path includes of a tenth NMOS transistor 805 having a gate to receive the fourth node voltage NN and an eleventh NMOS transistor 815 having a gate to receive a code Ncode4. The tenth NMOS transistor 805 forms a current mirror with the NMOS transistor 843 of the current mixer 540 such that a current sixteen times the current Id' flows through the tenth NMOS transistor 805.

The currents flow through the NMOS transistors 801, 802, 803, 804 and 805 if the corresponding NMOS transistors 811, 812, 813, 814 and 815 are turned on by the test code Ncode [0:4]. Accordingly, the current Ie corresponds to the sum of the currents flowing through the NMOS transistors 800, 801, 802, 803, 804, and 805 in response to the test code Ncode [4.0]. The current Ie flows through the PMOS transistor 851, generating a fifth node voltage NP at the gate and drain of the PMOS transistor 851.

In the first current multiplier 550, the sum of the widths of the NMOS transistors 801, 802, 803, 804 and 805, through which current flows changes in response to the test code Ncode[0:4]. As the test code Ncode[0:4] increases, the sum of the width of the NMOS transistors 801, 802, 803, 804, and 805 on through which current flow increases, and thus the current Ie is increased. Similarly, as the test code Ncode[0:4] decreases, the sum of the widths of the NMOS transistors 801, 802, 803, 804, and 805 through which current flows decreases, and thus the current Ie is decreased. Although the test code Ncode[0:4] has been described as having 5 bits in this embodiment, the number of bits is not limited to 5 and may be more or less as desired.

The second current multiplier 560 includes a second current controller 860 controlling the current If in response to the tracking code Pcode[0:4] and an NMOS transistor 861, which are coupled between the power supply voltage $V_{T/S}$ and the ground voltage Vss.

The second current controller 860 has multiple current paths similarly to the first current controller 852 of the first current multiplier 550. A first current path includes a first PMOS transistor 821 having a gate to receive the fifth node voltage NP and a second PMOS transistor 831 having a gate to receive a tracking code Pcode0. The first PMOS transistor 821 forms a current mirror with the PMOS transistor 851 of the first current multiplier 550 such that a current one times the current Ie flows through the first PMOS transistor 821.

A second current path includes a third PMOS transistor 822 having a gate to receive the fifth node voltage NP and a fourth PMOS transistor 832 having a gate to receive a tracking code Pcode1. The third PMOS transistor 822 forms a current mirror with the PMOS transistor 851 of the first current multiplier 550 such that a current two times the current Ie flows through the third PMOS transistor 822.

A third current path includes a fifth PMOS transistor 823 having a gate to receive the fifth node voltage NP and a sixth PMOS transistor 833 having a gate to receive a tracking code Pcode2. The fifth PMOS transistor 823 forms a current mirror with the PMOS transistor 851 of the first current multiplier 550 such that a current four times the current Ie flows through the fifth PMOS transistor 823.

A fourth current path includes a seventh PMOS transistor 824 having a gate to receive the fifth node voltage NP and an eighth PMOS transistor 834 having a gate to receive a tracking code Pcode3. The seventh PMOS transistor 824 forms a current mirror with the PMOS transistor 851 of the first current multiplier 550 such that a current eight times the current Ie flows through the seventh PMOS transistor 824.

A fifth current path includes a ninth PMOS transistor 825 having a gate to receive the fifth node voltage NP and a tenth PMOS transistor 835 having a gate to receive a tracking code Pcode4. The ninth PMOS transistor 825 forms a current mirror with the PMOS transistor 851 of the first current multiplier 550 such that a current sixteen times the current Ie flows through the ninth PMOS transistor 825.

The currents flow through the PMOS transistors 821, 822, 823, 824, and 825, if the corresponding PMOS transistors 831, 832, 833, 834 and 835 are turned on by the test code Pcode[0:4]. Accordingly, the current If corresponds to the sum of the currents flowing through the PMOS transistors 821, 822, 823, 824, and 825, in response to the test code Pcode[4.0]. The current If flows through the NMOS transistor 861, generating a fifth node voltage NP at the gate and drain of the NMOS transistor 861.

In the second current multiplier 560, the sum of the widths of the PMOS transistors 821, 822, 823, 824, and 825, through which current flows changes in response to the test code Pcode[0:4] as the test code Pcode[0:4] increases, the sum of the width of the PMOS transistors 821, 822, 823, 824, and 825, on through which current flow increases, and thus the current If increases. Similarly, as the test code Pcode[0:4] decreases, the sum of the widths of the PMOS transistors 821, 822, 823, 824, and 825, through which current flows decreases, and thus the current If decreases. Although the test code Pcode[0:4] has been described as having 5 bits in this embodiment, the number of bits is not limited to 5.

In one example, in the second current multiplier 560, the tracking code Pcode[0:4] may be set to "11111" when the temperature is 100° C. Thus, the current If does not flow when temperature is 100° C. In contrast if the tracking code Pcode [0:4] is set to "00000" the maximum If current If_max flows at 0° C.

The current comparator 570 includes a first comparator 571 to compare the current Ia and current Ib−If to each other and a second comparator 572 to compare the current Ib and current Ia+If to each other. The first comparator 571 includes first and second PMOS transistors 871 and 872 and first, second, and third NMOS transistors 873, 874 and 875.

The first PMOS transistor 871 has a source coupled to the power supply voltage $V_{T/S}$ and a gate coupled to the first node voltage NA. The first PMOS transistor 871 forms a current mirror with the first PMOS transistor MP1 of the PTAT current generator 510. The current Ia flows through the first PMOS transistor 871.

The second PMOS transistor 872 has a source coupled to the power supply voltage $V_{T/S}$ and a gate coupled to the second node voltage NB. The second PMOS transistor 872 forms a current mirror with the PMOS transistor 621 of the first CTAT current generator 520. The current Ib flows through the second PMOS transistor 872.

The first NMOS transistor 873 has a drain coupled to the drain of the first PMOS transistor 871, a gate coupled to the gate of the second NMOS transistor 874, and a source coupled to the ground voltage Vss. The second NMOS transistor 874 has a drain and a gate which are coupled to the drain of the second PMOS transistor 872, and a source coupled to the ground voltage Vss. The first and second NMOS transistors 873 and 874 form a current mirror such that the current of the first NMOS transistor 873 flows according to the current of the second NMOS transistor 874.

The third NMOS transistor 875 has a drain coupled to the drain of the second NMOS transistor 874, a gate coupled to the gate of the NMOS transistor 861 of the second current multiplier 560, and a source coupled to the ground voltage Vss. The third NMOS transistor 875 forms a current mirror with the NMOS transistor 861 of the second current multiplier 560. The current If flows through the third NMOS transistor 875. The current obtained by subtracting the current If from the current Ib, that is, Ib−If, flows through the second NMOS transistor 874.

The first comparator 571 compares the current Ia provided through the first PMOS transistor 871 to the current Ib−If flowing through the second NMOS transistor 874 to generate a first comparison signal DIFB1.

The second comparator 572 includes first and second PMOS transistors 876 and 877, first and second NMOS transistors 878 and 879, third and fourth PMOS transistors 880 and 881, and a third NMOS transistor 882. The first PMOS transistor 876 has a source coupled to the power supply voltage $V_{T/S}$ and a gate coupled to the second node voltage NB. The first PMOS transistor 876 forms a current mirror with the PMOS transistor 621 of the first CTAT current generator 520. The current Ib flows through the first PMOS transistor 876.

The second PMOS transistor 877 has a source coupled to the power supply voltage $V_{T/S}$ and a gate coupled to the first node voltage NA. The second PMOS transistor 877 forms a current mirror with the PMOS transistor MP1 of the PTAT current generator 510. The current Ia flows through the second PMOS transistor 877.

The first NMOS transistor 878 has a drain coupled to the drain of the first PMOS transistor 876, a gate coupled to the gate of the second NMOS transistor 879, and a source coupled to the ground voltage Vss. The second NMOS transistor 879 has a drain and a gate, which are coupled to the drain of the second PMOS transistor 877, and a source coupled to the ground voltage Vss. The first and second NMOS transistors 878 and 879 form a current mirror such that the current of the first NMOS transistor 878 flows according to the current of the second NMOS transistor 879.

The third PMOS transistor 880 has a source coupled to the power supply voltage $V_{T/S}$, a gate coupled to the gate of the fourth PMOS transistor 881, and a drain coupled to the drains of the second PMOS transistor 877 and the second NMOS transistor 879. The fourth PMOS transistor 881 has a source coupled to the power supply voltage $V_{T/S}$, and a gate and a drain coupled to each other. The third and fourth PMOS transistors 880 and 881 form a current mirror such that the current of the third PMOS transistor 880 flows according to the current of the fourth PMOS transistor 881.

The third NMOS transistor 882 has a drain coupled to the drain of the fourth PMOS transistor 881, a gate coupled to the gate of the NMOS transistor 861 of the second current multiplier 560, and a source coupled to the ground voltage Vss. The third NMOS transistor 882 forms a current mirror with the NMOS transistor 861 of the second current multiplier 560. The current If flows through the third NMOS transistor 882.

The current If flows through the fourth PMOS transistor 881 according to the current If of the third NMOS transistor 882. The current If flows through the third PMOS transistor 880 according to the current If of the fourth PMOS transistor 881. The current Ia+If corresponding to the sum of the current Ia of the second PMOS transistor 877 and the current If of the third PMOS transistor 880 flows through the second NMOS transistor 879.

The second comparator 572 compares the current Ib provided through the first PMOS transistor 871 to the current Ia+If flowing through the second NMOS transistor 879 to generate a second comparison signal DIF1.

Figure 9:
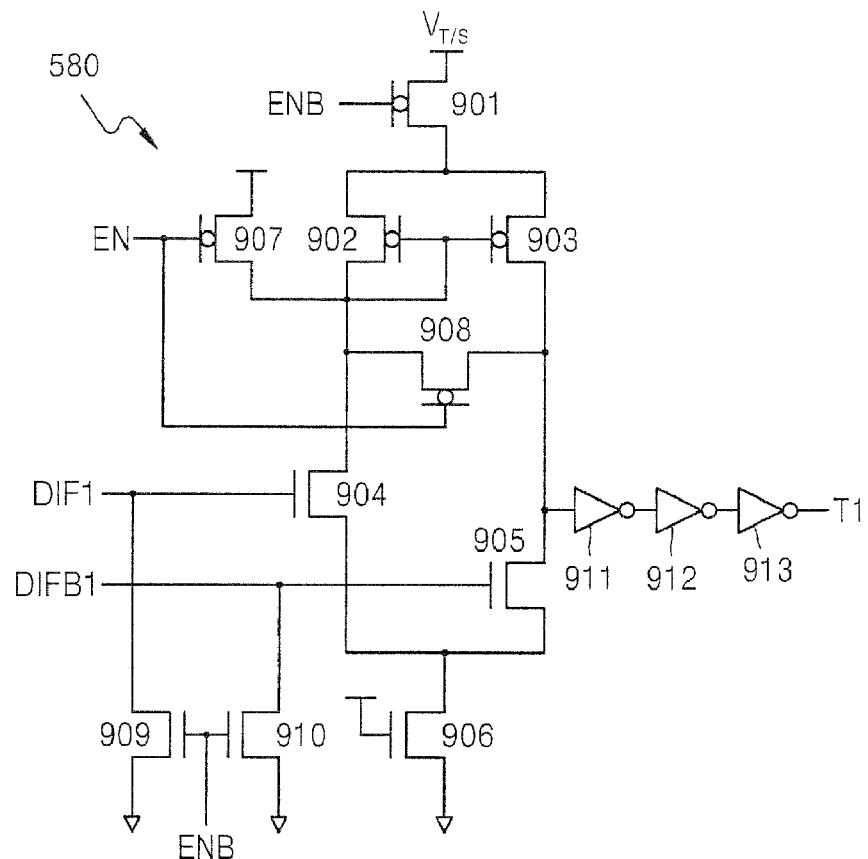
FIG. 9 is a circuit diagram of a diffierential amplifier of FIG. 5.

FIG. 9 is a circuit diagram of the differential amplifier 580 of FIG. 5. Referring to FIG. 9, the differential amplifier 580 includes a first PMOS transistor 901 having a source coupled to the power supply voltage $V_{T/S}$ and a gate receiving a complementary temperature sensor enable signal ENB. The drain of the first PMOS transistor 901 is coupled to the sources of second and third PMOS transistors 902 and 903. The gate and drain of the second PMOS transistor 902 are coupled to each other. The gates of the second and third PMOS transistors 902 and 903 are coupled to each other.

The drains of the second and third PMOS transistors 902 and 903 are respectively coupled to the drains of first and second NMOS transistors 904 and 905. The gate of the first NMOS transistor 904 is to receive the second comparison signal DIF1 and the gate of the second NMOS transistor 905 is to receive the First comparison signal DIFB1. The sources of the first and second NMOS transistors 904 and 905 are coupled to the drain of a third NMOS transistor 906. The third NMOS transistor 906 has a gate coupled to the power supply voltage $V_{T/S}$ and a source coupled to the ground voltage Vss.

A fourth PMOS transistor 907 has a source coupled to the power supply voltage $V_{T/S}$, a gate to receive a temperature sensor enable signal EN, and a drain coupled to the drains of the second PMOS transistor 902 and the first NMOS transistor 904. A fifth PMOS transistor 908 having a gate to receive the temperature sensor enable signal EN is coupled between the drain of the second PMOS transistor 902 and the drain of the third PMOS transistor 903.

A fourth NMOS transistor 909 is coupled between the second comparison signal DIF1 and the ground voltage Vss and has a gate to receive the complementary temperature sensor enable signal ENB. A fifth NMOS transistor 910 is coupled between the first comparison signal DIFB1 and the ground voltage Vss and has a gate to receive the complementary temperature sensor enable signal ENB.

The drains of the third PMOS transistor 903 and the second NMOS transistor 905 are coupled to the input of a first inverter 911. The output of the first inverter 911 passes through second and third inverters 912 and 913 to be output as a first output signal T1.

Figure 10:
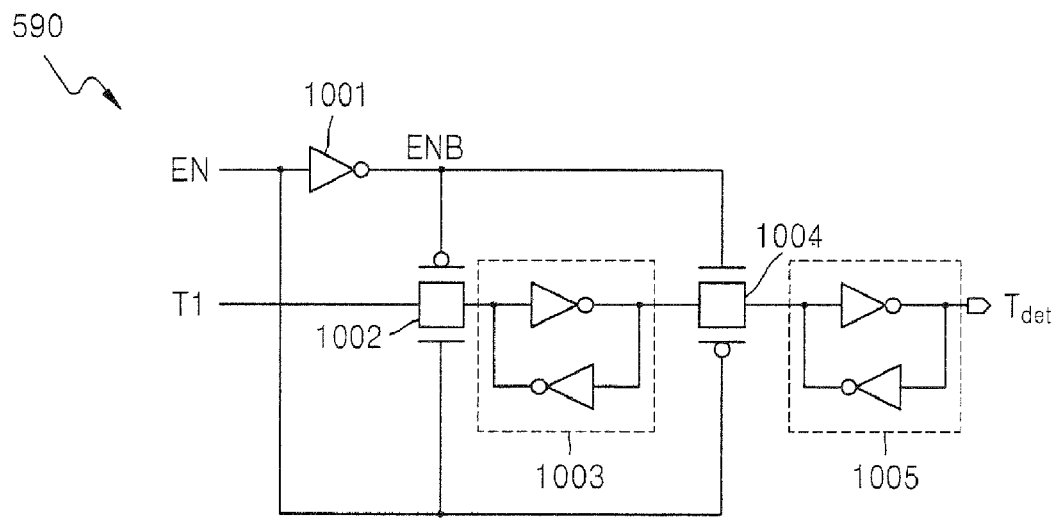
FIG. 10 is a circuit diagram of a latch of FIG. 5.

FIG. 10 is a circuit diagram of the latch 590 of FIG. 5. Referring to FIG. 10, the latch 590 includes an inverter 1001, a first transfer part 1002, a first latch 1003, a second transfer part 1004, and a second latch 1005. The inverter 1001 receives the temperature sensor enable signal EN and outputs the complementary temperature sensor enable signal ENB. The first transfer part 1002 transfers the differential output signal T1 of the differential amplifier 580 to the first latch 1003 in response to the temperature sensor enable signal EN at a logic high level and the complementary temperature sensor enable signal ENB at a logic low level. The first latch 1003 latches the differential output signal T1 transferred through the first transfer part 1002. The second transfer part 1004 transfers data stored in the first latch 1003 to the second latch 1005 in response to the temperature sensor enable signal EN at a logic low level and the complementary temperature sensor enable signal ENB at a logic high level. The second latch 1005 latches the differential output signal T1 transferred through the second transfer part 1004 and outputs the temperature detection signal Tdet.

The operations of the current comparator 570 of FIG. 8, the differential amplifier 580 of FIG. 9, and the latch 590 of FIG. 10 will now be explained.

The current comparator 570 generates the first comparison signal DIFB1 at a logic high level when the current Ib−If is smaller than the current Ia and generates the second comparison signal DIF1 at a logic low level when the current Ia+If is larger than the current Ib. The differential amplifier 580 compares the first comparison signal DIFB1 at a logic high level to the second comparison signal DIF1 at a logic low level to generate the differential output signal T1 at a logic high level. The latch 590 latches the differential output signal T1 at a logic high level in response to the temperature enable signal EN and outputs the temperature detection signal Tdet at a logic high level.

The current comparator 570 generates the first comparison signal DIFB1 at a logic low level when the current Ib−If is larger than the current Ia and generates the second comparison signal DIF1 at a logic high level when the current Ia+If is smaller than the current Ib. The differential amplifier 580 compares the first comparison signal DIFB1 at a logic low level to the second comparison signal DIF1 at a logic high level to generate the differential output signal T1 at a logic low level. The latch 590 latches the differential output signal T1 at a logic low level in response to the temperature enable signal EN and outputs the temperature detection signal Tdet at a logic low level.

Figure 11:
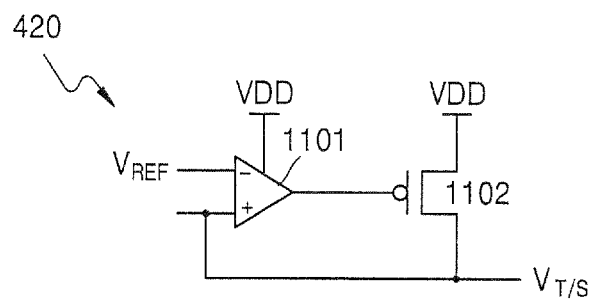
FIG. 11 is a circuit diagram of a power generator of FIG. 4.

FIG. 11 is a circuit diagram of the power generator of FIG. 4. Referring to FIG. 11, the power generator 410 includes a comparator 1101 to compare a reference voltage $V_{REF}$ to the power supply voltage $V_{T/S}$ of the temperature sensor, and a PMOS transistor 1102 generating the temperature sensor power supply voltage $V_{T/S}$ from a chip power supply voltage VDD in response to the output of the comparator 1101. Here, the reference voltage $V_{REF}$ is set such that it is identical to the desired temperature sensor power supply voltage $V_{T/S}$.

When the temperature sensor power supply voltage $V_{T/S}$ is lower than the reference voltage $V_{REF}$, the comparator 1101 generates a logic low signal. The PMOS transistor 1102 is turned on in response to the logic low signal output from the comparator 1101, and thus the temperature sensor power supply voltage $V_{T/S}$ is increased. When the temperature sensor power supply voltage $V_{T/S}$ is higher than the reference voltage $V_{REF}$, the comparator 1101 generates a logic high signal. The PMOS transistor 1102 is turned off in response to the logic high signal output from the comparator 1101. This operation is repeated such that the power generator 420 generates the power supply voltage $V_{T/S}$ that is identical to the reference voltage $V_{REF}$.

Figure 12:
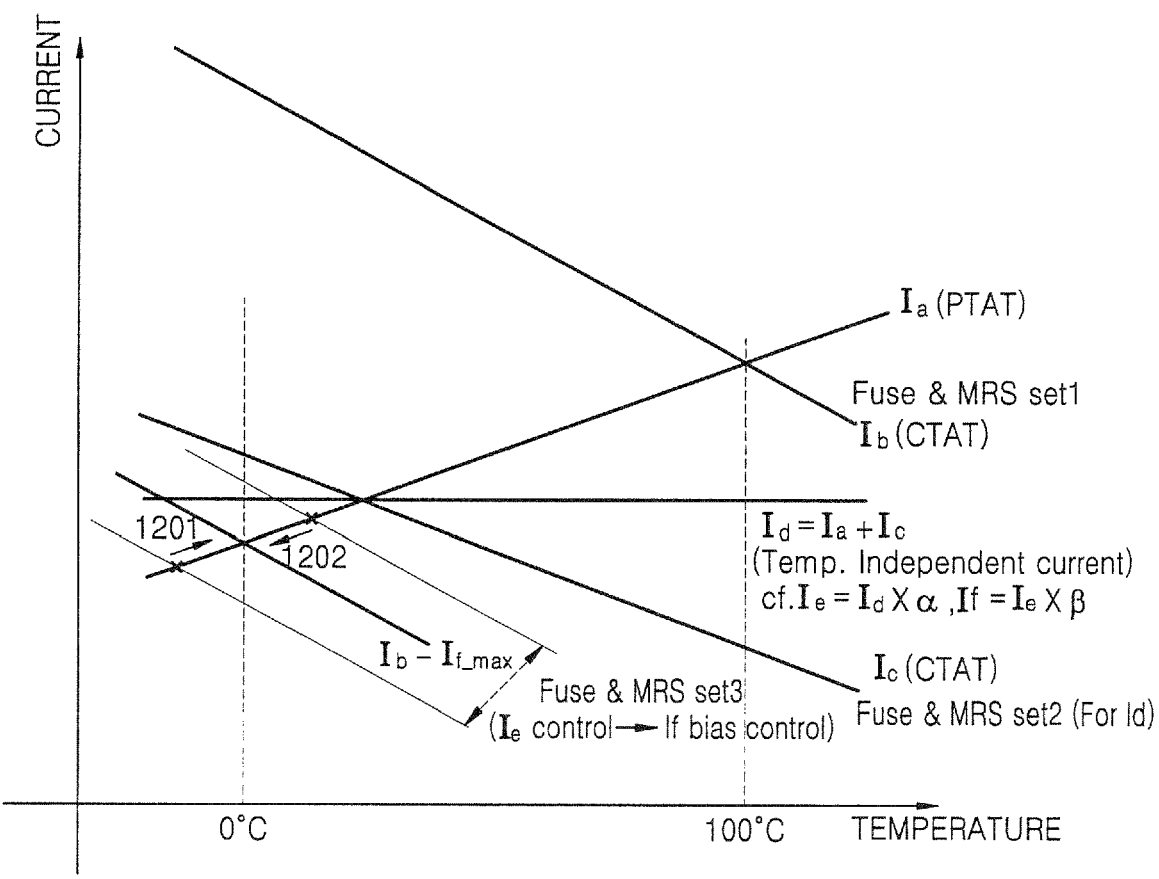
FIGS. 12, 13 and 14 are graphs for explaining the operations of the current mixer, the first current multiplier, the second current multiplier and the current comparator of FIG. 8 in connection with the graph of FIG. 7.
Figure 13:
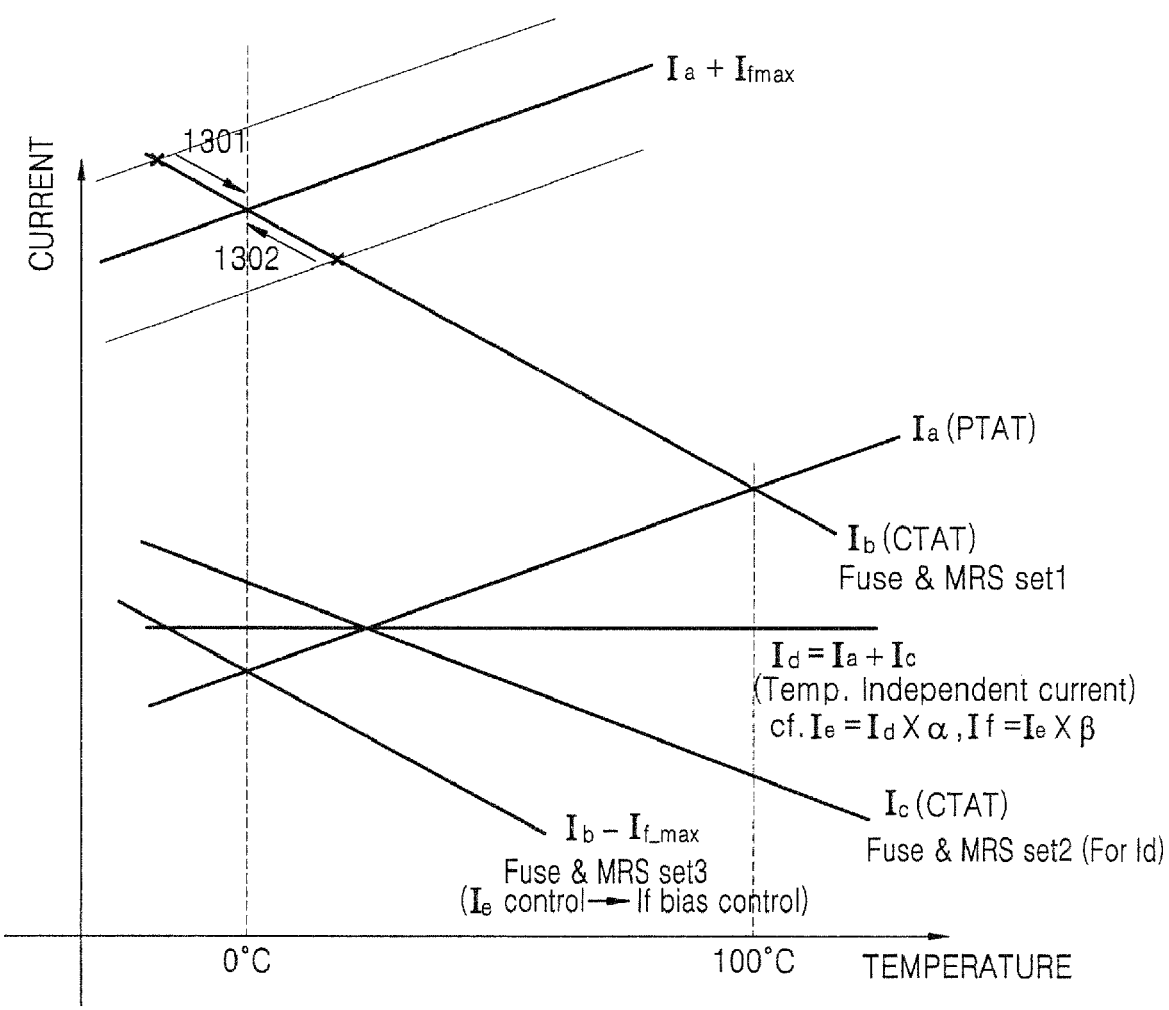
Figure 14:
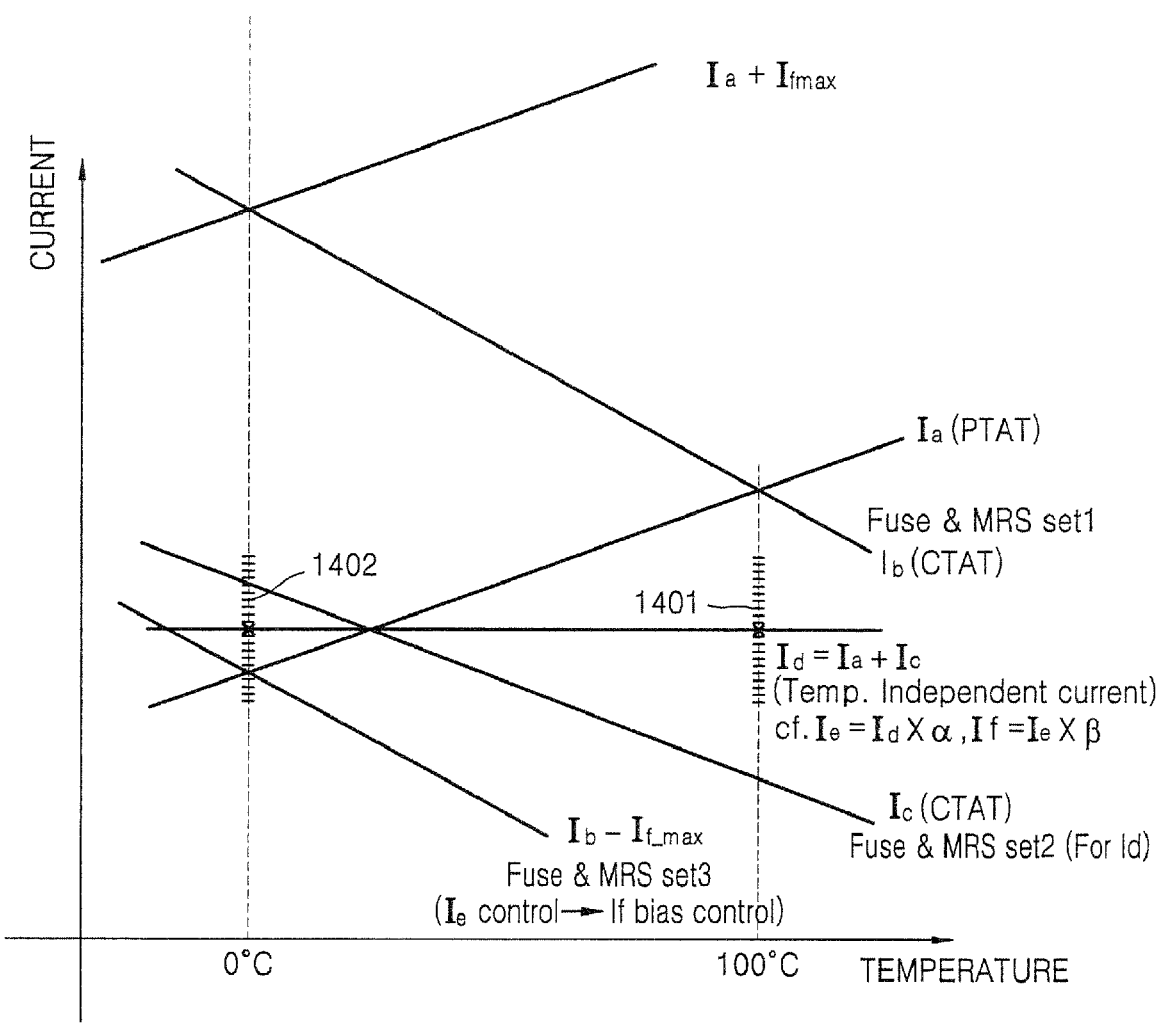

FIGS. 12, 13 and 14 are graphs for explaining the operations of the current mixer 540, the first current multiplier 550, the second current multiplier 560 and the current comparator 570 of FIG. 8 and the operation of the differential amplifier 580 of FIG. 9 in connection with the temperature characteristic graph of FIG. 7.

Referring to FIG. 12, when the temperature sensor 410 is placed at a temperature of 0° C. and the tracking code Pcode [0:4] is set to "00000", the maximum If current If_max flows through the second current multiplier 560. The first comparator 571 of the current comparator 570 compares the current Ia and current Ib−If_max to each other. When the cross point of the current Ia and current Ib−If_max is located lower than 0° C., it means that the temperature sensed by the temperature sensor 410 is lower than the chip's current temperature 0° C. Here, the temperature detection signal Tdet of the temperature sensor 410 is at a logic high level.

The first current multiplier 550 decreases the current Ie by reducing the test code Ncode[0:4] by 1. Accordingly, the current If_max is decreased, and thus the current Ib−If_max is increased (1201). This operation is repeated until the cross point of the current Ia and the current Ib−If_max corresponds to 0° C., that is, the sensed temperature of the temperature sensor 410 represents the current temperature 0° C. Here, the temperature detection signal Tdet of the temperature sensor 410 changes from a logic high to a logic low level.

When the cross point of the current Ia and the current Ib−If_max is located higher than 0° C., it means that the sensed temperature of the temperature sensor 410 is higher than the chip's current temperature 0° C. Here, the temperature detection signal Tdet of the temperature sensor 410 is at a logic low level.

The first current multiplier 550 increases the current Ie by increasing the test code Ncode[0:4] by 1. Accordingly, the current If_max is increased, and thus the current Ib−If_max is decreased (1202). This operation is repeated until cross point of the current Ia and the current Ib−If_max corresponds to 0° C. to make the sensed temperature of the temperature sensor 410 represents the current temperature 0° C.

Referring to FIG. 13, the second comparator 572 of the current comparator 570 compares the current Ib and current Ia+If_max to each other. When the cross point of the current Ib and current Ia+If_max is lower than 0° C., it means that the sensed temperature of the temperature sensor 410 is lower than the chip's current temperature 0° C. Here, the temperature detection signal Tdet of the temperature sensor 410 is at a logic high level.

The first current multiplier 550 decreases the current Ie by reducing the test code Ncode[0:4] by 1. Accordingly, the current If_max is decreased, and thus the current Ia+If_max is decreased (1301). This operation is repeated until the cross point of the current Ib and the current Ia+If_max corresponds to 0° C., that is, the sensed temperature of the temperature sensor 410 represents the current temperature 0° C. Here, the temperature detection signal Tdet of the temperature sensor 410 changes from logic high to a logic low level.

When the cross point of the current Ib and the current Ia+If_max is higher than 0° C., it means that the sensed temperature of the temperature sensor 410 is higher than the chip's current temperature 0° C. Here, the temperature detection signal Tdet of the temperature sensor 410 is at a logic low level.

The first current multiplier 550 increases the current Ie by increasing the test code Ncode[0:4] by 1. Accordingly, the current If_max is increased, and thus the current Ia+IF_max is increased (1302). This operation is repeated until the cross point of the current Ib and the current Ia+If_max corresponds to 0° C. to make the sensed temperature of the temperature sensor 410 become identical to the current temperature 0° C. Here, the temperature detection signal Tdet of the temperature sensor 410 changes from a logic low to a logic high level.

When the sensed temperature of the temperature sensor 410 is identical to the current temperature 0° C., the state of the test code Ncode[0:4] obtained in response to the operation of the first comparator 571 is identical to the state of the test code Ncode[0:4] obtained in response to the operation of the second comparator 572. The state of the test code Ncode[0:4] is selectively stored in a third mode register. The NMOS transistors 811, 812, 813, 814 and 815 of the first current controller 852 may be fuse-trimmed to be enabled according to the state of the test code Ncode[0:4].

Referring to FIG. 14, the current mixer 540 measures the current Id when the temperature of the temperature sensor 410 is 100° C. At this temperature, the current mixer 540 measures the current Id for each the states of the second control signals TUBB0 through TUBB5 and TDBB0 through TDBB5 of the second CTAT current generator 530 (1401). Similarly, the current mixer 540 measures the current Id for each of the states of the second control signals TUBB0 through TUBB5 and TDBB0 through TDBB5 when the temperature is 0° C. (1402).

The difference between the current Id at 100° C. and the current Id at 0° C. for each of the states of the second control signals TUBB0 through TUBB5 and TDBB0 through TDBB5 is obtained. When the absolute value of the difference has the smallest value, the state of the second control signals TUBB0 through TUBB5 and TDBB0 through TDBB5 is stored in a second mode register. Alternatively, the resistor branch 624 of the second CTAT current generator 530 can be selectively fuse-cut according to the state of the second control signals TUBB0 through TUBB5 and TDBB0 through TDBB5.

Figure 15A:
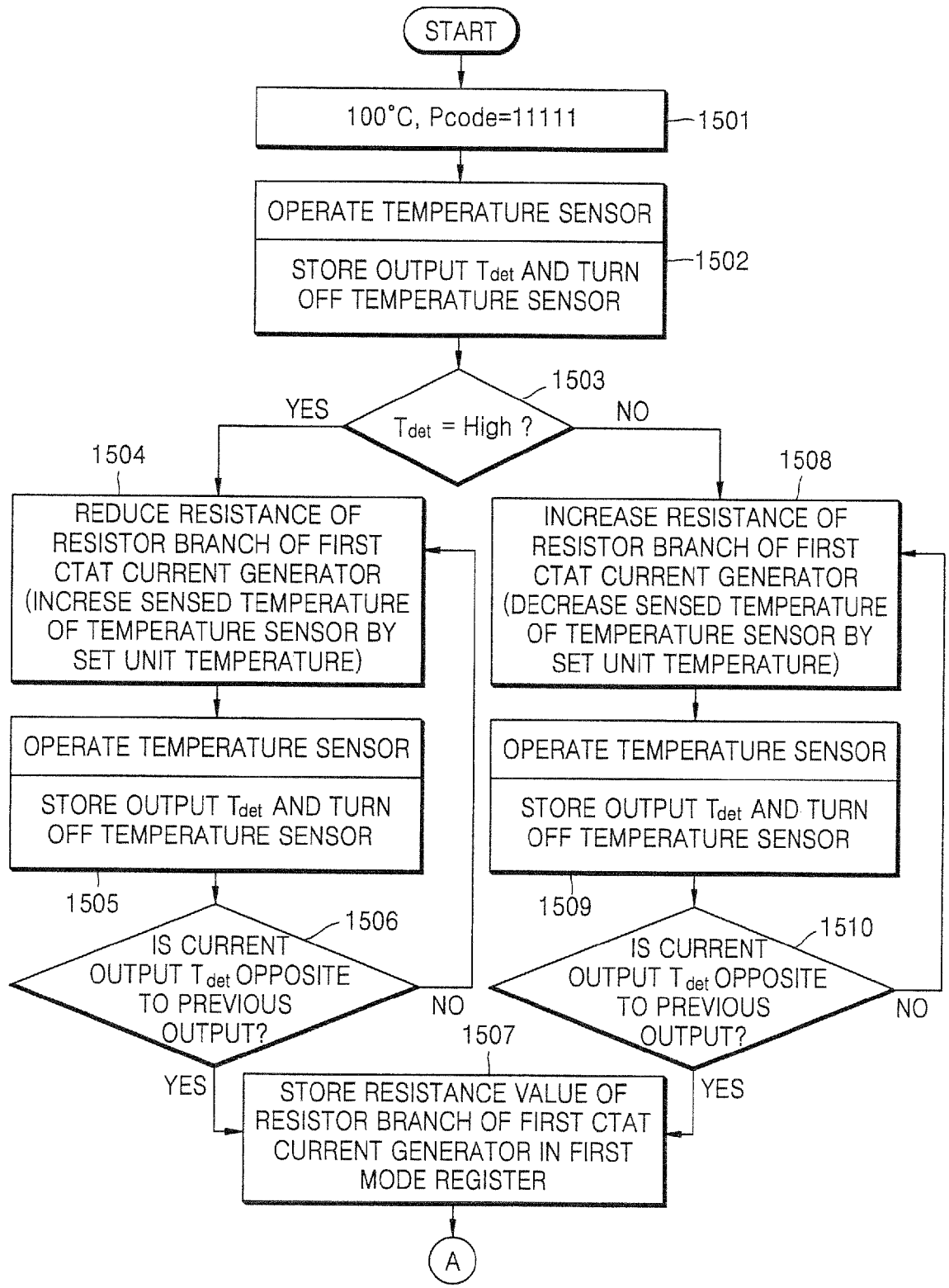
FIGS. 15a, 15b and 15c are flow charts showing the operation of the temperature sensor of FIG. 5.
Figure 15B:
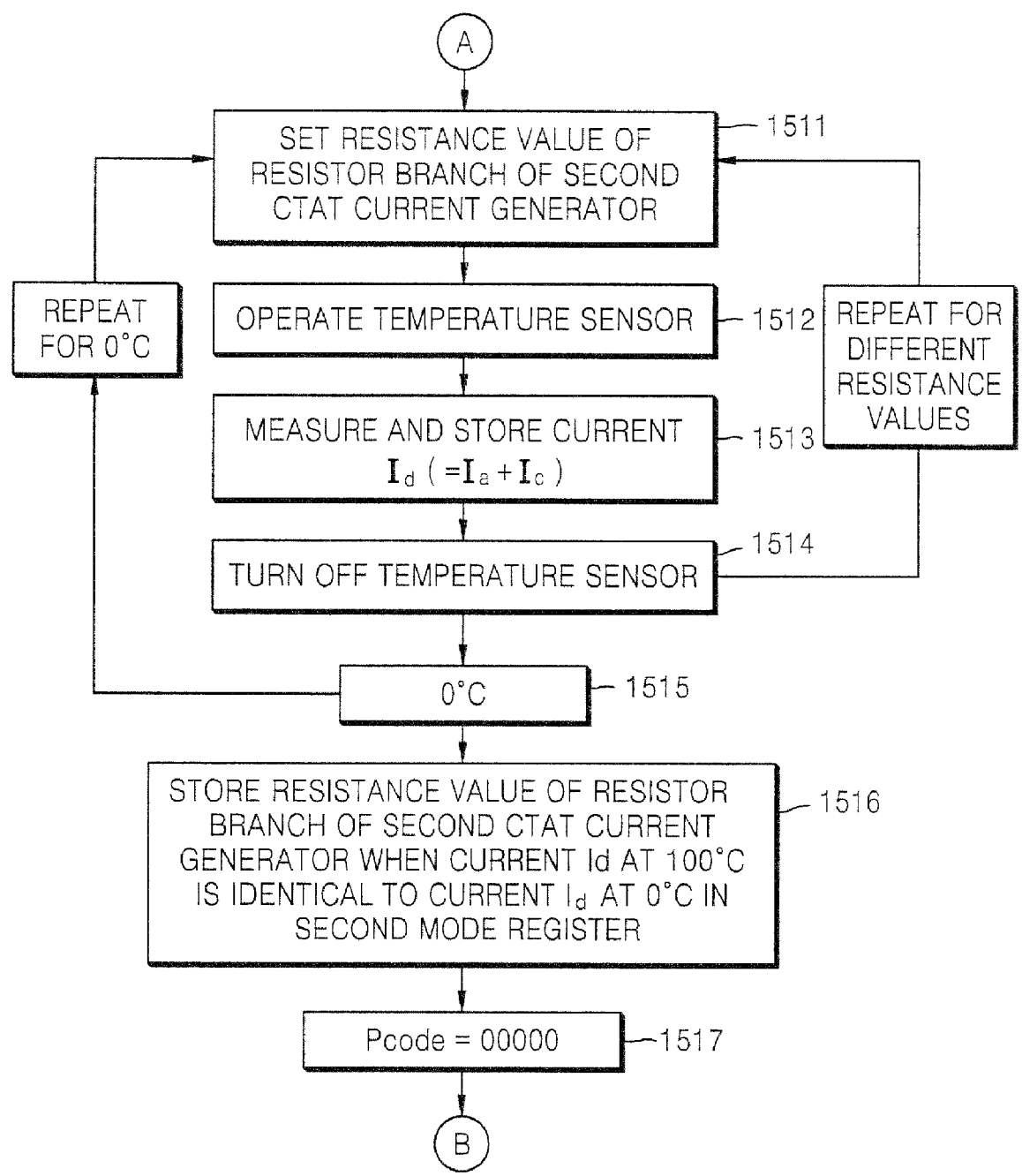
Figure 15C:
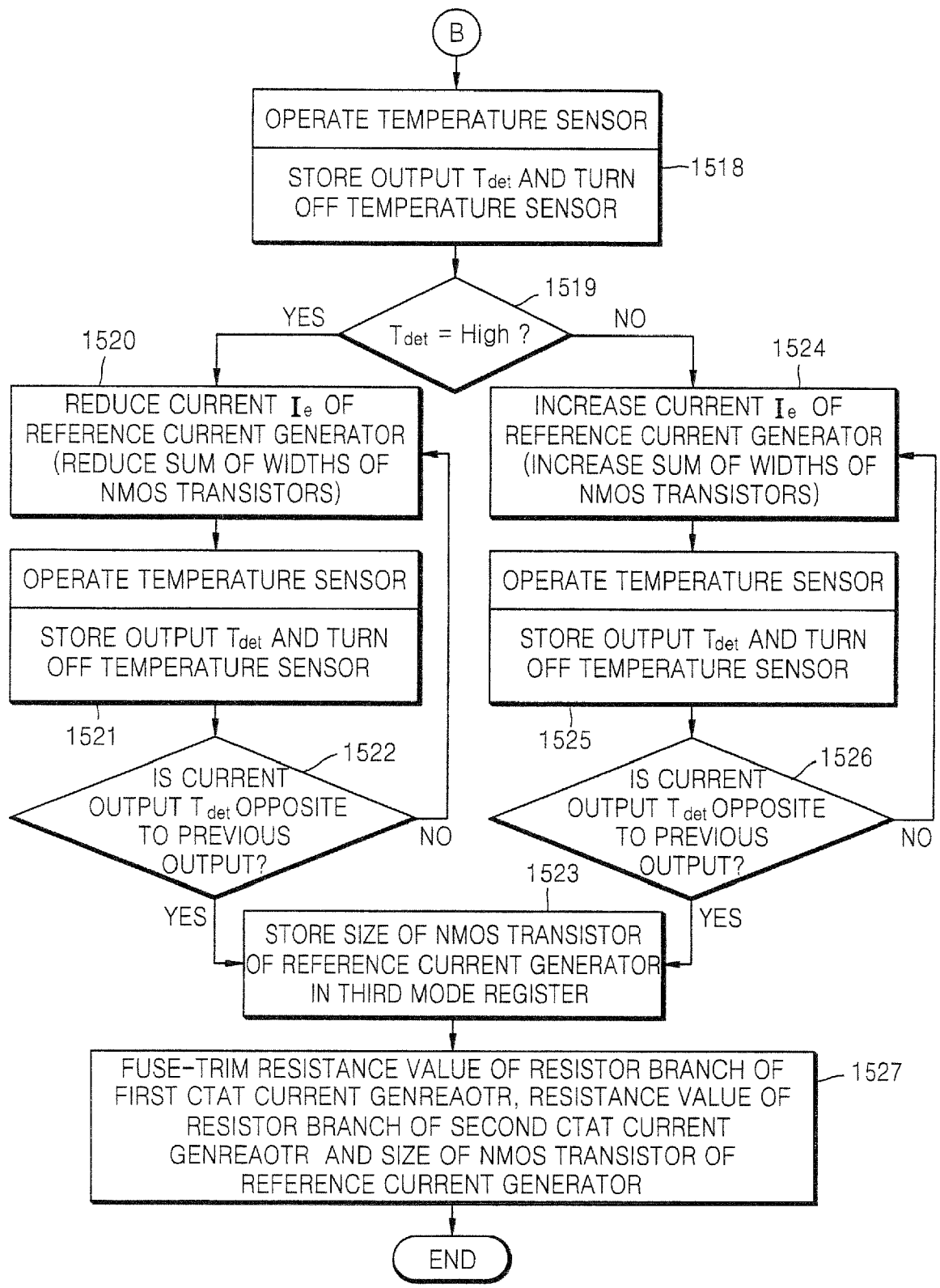

FIGS. 15a, 15b and 15c are flow charts showing the operation of the temperature detector 400. Referring to FIG. 15a, the tracking code Pcode is set to "11111" and the current temperature of the chip including the temperature detector 400 is set to 100° C. in 1501.

The temperature sensor 410 is operated to compare the temperature sensed by the temperature sensor 410 to the current temperature of the chip, 100° C., to generate and store the differential output signal T1. After the temperature sensor 410 is disabled, the temperature detection signal Tdet latched in the latch 590 is output in 1502.

It is determined whether the temperature detection signal Tdet is at a logic high level in 1503. If the temperature detection signal Tdet is at a logic high level, the sensed temperature of the temperature sensor 410 is lower than the current temperature of the chip. To increase the sensed temperature of the temperature sensor 410, the first CTAT current generator 520 selectively enables the first control signals TUBA0 through TUBA5 and TDBA0 through TDBA5 to reduce the resistance value of the resistor branch 624. Accordingly, the current Ib is increased, increasing the temperature crossing of the current Ib and the current Ia, and thus the sensed temperature of the temperature sensor 410 is increased in 1504.

The temperature sensor 410 is operated again to compare the sensed temperature of the temperature sensor 410 to the current temperature of the chip to generate and store the differential output signal T1. After the temperature sensor 410 is disabled, the temperature detection signal Tdet latched in the latch 590 is output in 1505.

The current output and the previous output of the temperature detection signal Tdet are compared to each other to judge whether they are opposite to each other in 1506. When they are identical to each other, it means the sensed temperature of the temperature sensor 410 is lower than the current temperature of the chip. Thus, 1504 and 1505 are repeated. When the current output and the previous output of the temperature detection signal Tdet are opposite to each other, the resistance value of the resistor branch 624 is stored by storing the state of the first control signals TUBA0 through TUBA5 and TDBA0 through TDBA5 in the first mode register in 1507.

Alternatively, if the temperature detection signal Tdet is at a logic low level in 1503, the sensed temperature of the temperature sensor 410 is higher than the current temperature of the chip. To decrease the sensed temperature of the temperature sensor 410, the first CTAT current generator 520 selectively enables the first control signals TUBA0 through TUBA5 and TDBA0 through TDBA5 to increase the resistance value of the resistor branch 624. Accordingly, the current Ib is reduced, decreasing the temperature crossing of the current Ib and the current Ia, and thus the sensed temperature of the temperature sensor 410 is decreased in 1508.

The temperature sensor 410 is operated to compare the sensed temperature of the temperature sensor 410 to the current temperature of the chip to generate and store the differential output signal T1. After the temperature sensor 410 is disabled, the temperature detection signal Tdet latched in the latch 590 is output in 1509.

The current output and the previous output of the temperature detection signal Tdet are compared to each other to judge whether they are opposite to each other in 1510. When they are identical to each other, it means the sensed temperature of the temperature sensor 410 is still higher than the current temperature of the chip. Thus, 1504 and 1505 are repeated. When they are opposite to each other, the resistance value of the resistor branch 624 is stored by storing the state of the first control signals TUBA0 through TUBA5 and TDBA0 through TDBA5 in the first mode register in 1507.

Referring to FIG. 15*b*, the resistor branch 634 is set to a particular value while the current temperature of the chip is maintained at 100° C. in 1511. The temperature sensor 410 is operated in 1512, the current Ia+Ic=Id is measured and stored in 1513, and the temperature sensor 410 is disabled in 1514. These operations are repeated to store the values of the current Id for varying resistance values according to the second control signals TUBB0 through TUBB5 and TDBB0 through TDBB5 while the current temperature of the chip is 100° C.

The current temperature of the chip is changed to 0° C. in 1515 and 1511, 1512, 1513 and 1514 are repeated to store the values of the current Id for varying resistance values according to the second control signals TUBB0 through TUBB5 and TDBB0 through TDBB5.

The resistance value of the resistor branch 624 is stored by storing the state of the first control signals TUBA0 through TUBA5 and TDBA0 through TDBA5 in the first mode register in 1516.

A state of the first control signals TUBA0 through TUBA5 and TDBA0 through TDBA5 is found where the difference between the current Id at 100° C. and the current Id at 0° C. is zero, meaning the currents are identical, or difference is a minimum. The resistance value of the resistor branch 634 in this state is stored by storing the second control signals TUBB0 through TUBB5 and TDBB0 through TDBB5 in the second mode register in 1516. In other words, the state of the second control signals TUBB0 through TUBB5 and TDBB0 through TDBB5 is stored in the second mode register when the absolute value of the current difference has the smallest value.

Subsequently, the tracking code Pcode[0:4] is set to "00000" in 1517.

Referring to FIG. 15*c*, the temperature sensor 410 is operated to compare the temperature sensed by the temperature sensor 410 to the current temperature of the chip, 0° C., to generate and store the differential output signal T1. After the temperature sensor 410 is disabled and the temperature detection signal Tdet is latched in the latch 590 and output in 1518.

If the temperature detection signal Tdet is at a logic high level in 1519, the sensed temperature of the temperature sensor 410 is lower than the current temperature of the chip. To increase the sensed temperature of the temperature sensor 410, the first current multiplier 550 reduces the current Ie in response to the test code Ncode[0:4] decreasing by 1 to. That is, the sum of the widths of the NMOS transistors 801, 802, 803, 804 and 805 that are conducting as the test code Ncode [0:4] is decreased is reduced, and thus the current Ie is decreased. When the current Ie decreases, the current If_max reduces, and thus the current Ib–If_max is increased. Accordingly, the sensed temperature of the temperature sensor 410 is increased in 1520.

The temperature sensor 410 is operated again to compare the sensed temperature of the temperature sensor 410 to the current temperature of the chip to generate and store the differential output signal T1. After the temperature sensor 410 is disabled, the temperature detection signal Tdet is latched in the latch 590 output in 1521.

The current output and the previous output of the temperature detection signal Tdet are compared to each other to judge whether they are opposite to each other in 1522. When they are identical to each other, it means the sensed temperature of the temperature sensor 410 is lower than the current temperature of the chip. Thus, 1520 and 1521 are repeated. When the current output and the previous output of the temperature detection signal Tdet are opposite to each other, the sum of the widths of the NMOS transistors 811, 812, 813, 814, and 815 that are conducting is stored by storing the test code Ncode [0:4] in the third mode register in 1523.

Alternatively, when the temperature detection signal Tdet is at a logic low level in 1519, the sensed temperature of the temperature sensor 410 is higher than the current temperature of the chip. To decrease the sensed temperature of the temperature sensor 410, the first current multiplier 550 increases the test code Ncode[0:4] by 1 to reduce the current Ie. That is, the sum of the widths of the NMOS transistors 801, 802, 803, 804, and 805 turned on is increased as the test code Ncode[0:4] is increased, and thus the current Ie is increased. The current If_max is increased, and thus the current Ib–If_max is decreased. Accordingly, the sensed temperature of the temperature sensor 410 is decreased in 1524, The temperature sensor 410 is operated again to compare the sensed temperature of the temperature sensor 410 to the current temperature of the chip to generate and store the differential output signal T1. After the temperature sensor 410 is disabled, the temperature detection signal Tdet is latched in the latch 590 and output in 1525.

The current output and the previous output of the temperature detection signal Tdet are compared to each other to judge whether they are opposite to each other in 1526. When they are identical to each other, the sensed temperature of the temperature sensor 410 is still higher than the current temperature of the chip. Thus, 1524 and 1525 are repeated. When they are opposite to each other, the sum of the widths of the NMOS transistors 811, 812, 813, 814, and 815 that are conducting is stored by storing the test code Ncode[0:4] in the third mode register in 1523.

The states stored in the mode registers described above may be set by fuse trimming appropriate fuses. Fuse trimming of the resistor branch 624 is performed according to the resistance value of the first CTAT current generator 520 stored in the first mode register. Fuse trimming of the resistor branch 634 is performed according to the resistance value of the second CTAT current generated 530 stored in the second mode register. Fuse trimming of the NMOS transistors 811, 812, 813, 814 and 815 is carried out according to the size (sum of widths) of the NMOS transistors 811, 812, 813, 814 and 815 of the first current multiplier 550, stored in the third mode register in 1527.

Figure 16:
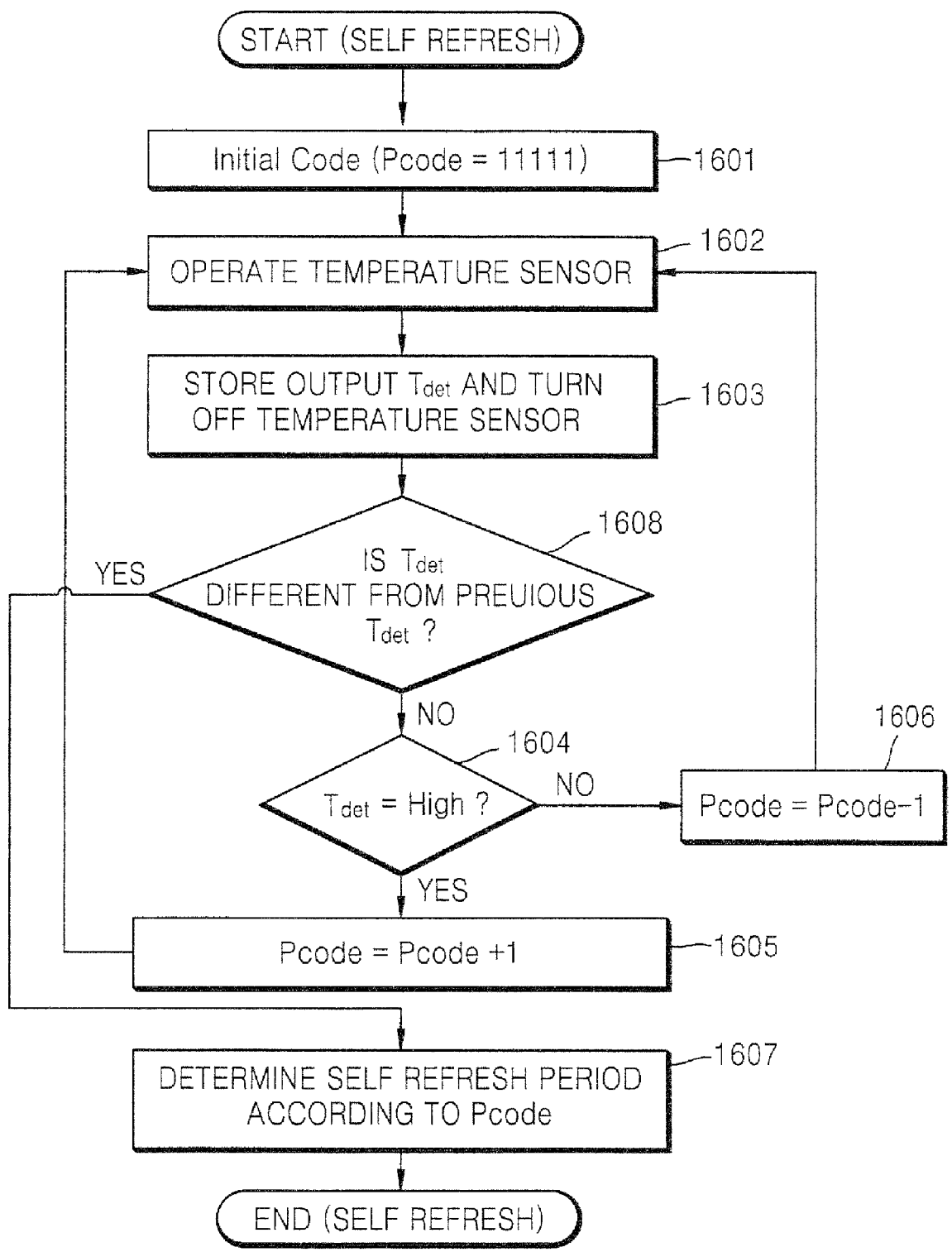
FIG. 16 is a flow chart showing a method of controlling a self refresh period after self refresh is started, using the temperature sensor of FIG. 5.

FIG. 16 is a flow chart showing a method of controlling a self refresh period after self refresh is started, using the temperature sensor 410 of FIG. 5. Referring to FIG. 16, the tracking code Pcode[0:4] is set to "11111" in 1601. The temperature sensor enable signal EN is activated to operate the temperature sensor 410 in 1602.

The temperature sensor 410 compares the temperature sensed by the temperature sensor 410 to the current temperature of the chip to generate and store the differential output signal T1. After the temperature sensor 410 is disabled, the latch 590 latches the temperature detection signal Tdet in 1603.

It is determined whether the temperature detection signal Tdet is at a logic high level in 1604. If the temperature detection signal Tdet is at a logic high level, it means that the sensed temperature of the temperature sensor 410 is lower than the current temperature of the chip. To increase the sensed temperature of the temperature sensor 410, the tracking code Pcode[0:4] is increased by 1 in 1605.

The sum of the widths of the PMOS transistors 831, 832, 833, 834 and 835 that are conducting in the second current multiplier 560 is decreased as the tracking code Pcode[0:4] is increased, and thus the current If is reduced. Accordingly, the sensed temperature of the temperature sensor 410 is increased by $$\frac{100}{2^5-1} °C..$$

Returning to 1602, the temperature sensor 410 is operated to compare the sensed temperature of the temperature sensor 410, increased by one step to the current temperature of the chip to generate the temperature detection signal Tdet in 1603. This operation is repeated until the temperature detection signal Tdet becomes a logic low level. When the temperature detection signal Tdet becomes a logic low level, it means that the sensed temperature of the temperature sensor 410 becomes identical to the current temperature of the chip. The change to a logic low level is detected in 1608. Accordingly, the self refresh period is determined by the current tracking code Pcode[0:4] in 1607.

Returning to 1604, when the temperature detection signal Tdet is initially at a logic low level, it means that the sensed temperature of the temperature sensor 410 is higher than the current temperature of the chip. To decrease the sensed temperature of the temperature sensor 410, the tracking code Pcode[0:4] is decreased by 1 in 1606. The sum of the widths of the PMOS transistors 831, 832, 833, 834 and 835 that are conducting in the second current multiplier 560 is increased as the tracking code Pcode[0:4] is decreased, and thus the current If is increased. Accordingly, the sensed temperature of the temperature sensor 410 is decreased by $$\frac{100}{2^5-1} °C..$$

The temperature sensor 410 is again operated to compare the sensed temperature of the temperature sensor 410 to the current temperature of the chip to generate the temperature detection signal Tdet in 1602. This operation is repeated until the temperature detection signal Tdet becomes a logic high level. When the temperature detection signal Tdet becomes a logic high level, it means that the sensed temperature of the temperature sensor 410 becomes identical to the current temperature of the chip. The change to a logic high level is detected in 1608. Accordingly, the self refresh period is determined by the current tracking code Pcode[0:4] in 1607.

Figure 17:
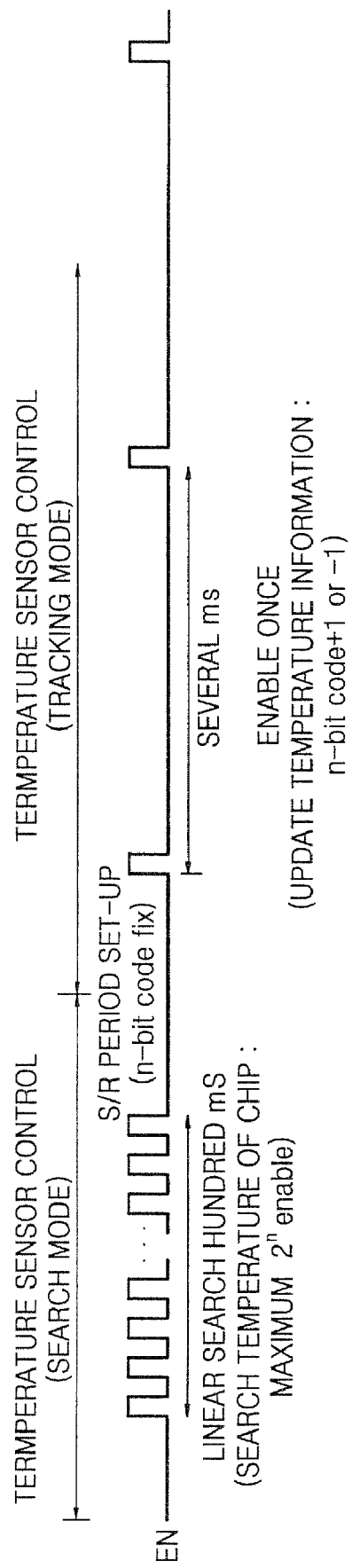
FIG. 17 is a timing diagram for explaining a self refresh control method using the temperature sensor of FIG. 5.

FIG. 17 is a timing diagram for explaining a self refresh control method using the temperature sensor 410 of FIG. 5. Referring to FIG. 17, the temperature sensor 410 is enabled maximum of $2^5$ times in order to detect the tracking code Pcode[0:4] where the sensed temperature of the temperature sensor 410 represents the current temperature of the chip according to the routine of FIG. 16. A period for changing the tracking code Pcode[0:4] may be as short as tens of microseconds, or less.

The tracking code Pcode[0:4] when the sensed temperature of the temperature sensor 410 becomes the current temperature of the chip is detected by linearly varying the sensed temperature of the temperature sensor 410 by $$\frac{100}{2^5-1} °C..$$

The self refresh period is set-up according to the detected tracking code Pcode[0:4]. This search operation may require a period of hundreds of milliseconds.

Thereafter, the tracking code Pcode[0:4] is updated by increasing or decreasing it by 1 every several milliseconds.

Figure 18:
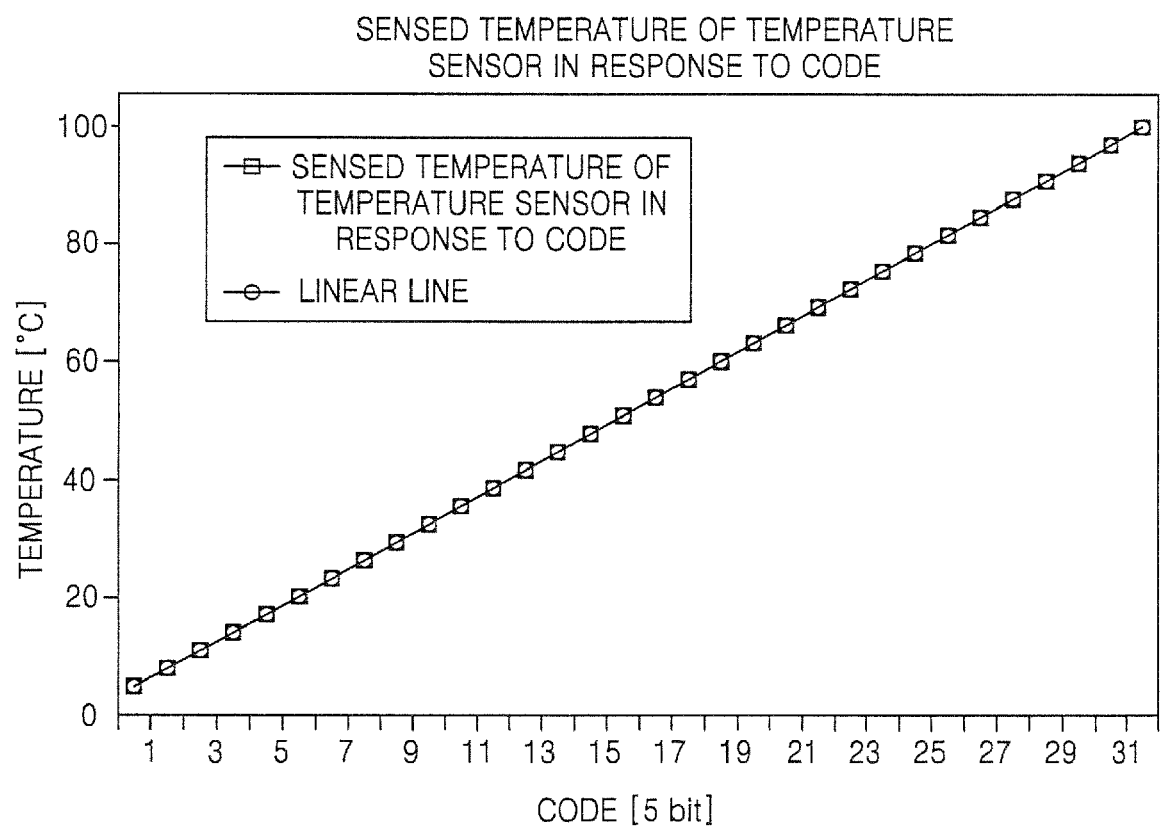
FIG. 18 is a graph showing a result of simulation of a sensed temperature in response to a variation in a tracking code Pcode[0:4] using the temperature sensor of FIG. 5.

FIG. 18 is a graph showing a result of simulation of the sensed temperature in response to a variation in the tracking code Peode[0:4] using the temperature sensor 410 according to an embodiment. It can be seen from FIG. 18 that the temperature sensor 410 linearly outputs the sensed temperature in unit of $$\frac{100}{2^5-1} °C.$$

over a variation in the tracking code Pcode[0:4].

Although storing a state of control signals has been described as storing in a mode register, such control signals may be alternately or additionally stored through fuse trimming appropriate fuses.

Although high and low temperatures of 100° C. and 0° C. have been described, one of ordinary skill in the art will understand that the temperature ranges may be selected as desired. Accordingly, the high and low temperatures will change, as will the temperature size of one unit of a sensed temperature. For example, if a high and a low temperature are 125° C. and −55° C., respectively, a unit of the sensed temperature may be $$\frac{180}{2^5-1} °C.$$

Although currents may have been described as identical or equal in particular states, one of ordinary skill in the art will understand that such currents may also be substantially equal. For example, when setting two currents to be equal to each other at a particular temperature using discrete control signals, a situation may arise where no state of the control signals will make the two currents exactly identical. However, a state of the control signals may exist where the difference between the two currents is a minimum. Such a state makes the currents substantially equal and may be referred to as making the currents equal. Similarly, any such current or value determined by discrete control signals may be referred to as equal or substantially equal to a target value at a particular state where the controlled value is closest to the target value.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A temperature sensor comprising:
   a proportional to absolute temperature (PTAT) current generator configured to generate a first current proportional to temperature;
   a first complementary to absolute temperature (CTAT) current generator configured to generate a second current inversely proportional to temperature;
   a second CTAT current generator configured to generate a third current inversely proportional to temperature; and
   a temperature sensing unit configured to adjust the second current such that the first current is substantially equal to the second current at a high temperature, to adjust the third current such that a sum of the first current and the third current has a minimum deviation from a constant over temperature, and to convert the first current, the second current, and the third current into a signal related to the temperature.

2. The temperature sensor of claim 1, wherein the temperature sensing unit further comprises:
   a current combiner configured to combine the first current and the third current into a fourth current; and
   a current comparator configured to convert the first current, the second current, and the fourth current into the signal related to the temperature.

3. The temperature sensor of claim 1, wherein the PTAT current generator further comprises:
   a first PMOS transistor having a source coupled to a power supply, and a gate and a drain coupled to each other;
   a second PMOS transistor having a source coupled to the power supply and a gate coupled to the gate of the first PMOS transistor;
   a first NMOS transistor having a gate and a drain coupled to the drain of the second PMOS transistor;
   a second NMOS transistor having a drain coupled to the drain of the first PMOS transistor and a gate coupled to the gate of the first NMOS transistor;
   a first diode coupled between the source of the first NMOS transistor and a ground; and
   a resistor and a second diode serially coupled between the source of the second NMOS transistor and the ground;
   wherein the ratio of the size of the first diode to the size of the second diode is 1:M.

4. The temperature sensor of claim 1, wherein each of the first CTAT current generator and the second CTAT current generator comprises:
   a PMOS transistor having a source coupled to a power supply, and a gate and a drain coupled to each other;
   a CTAT NMOS transistor having a drain coupled to the drain of the PMOS transistor and a gate coupled to a gate of an NMOS transistor of the PTAT current generator; and
   a variable resistor coupled between a source of the CTAT NMOS transistor and a ground, and configured to change resistance in response to an associated plurality of control signals.

5. The temperature sensor of claim 4, wherein the variable resistor of the second CTAT current generator has a value such that a gradient of the first current versus temperature is substantially equal to a gradient of the third current versus temperature.

6. The temperature sensor of claim 4, wherein for each of the first CTAT current generator and the second CTAT current generator, the variable resistor further comprises:
   a plurality of resistors serially coupled between the source of the CTAT NMOS transistor and the ground; and
   a plurality of second NMOS transistors, each second NMOS transistor coupled in parallel to an associated resistor, and having a gate to receive one of the control signals.

7. The temperature sensor of claim 4, further comprising for each of the first CTAT current generator and the second CTAT current generator, a mode register configured to store states of the associated control signals.

8. The temperature sensor of claim 7, wherein the mode register associated with the first CTAT current generator is configured to store the state of the associated control signals when the first current is substantially equal to the second current.

9. The temperature sensor of claim 7, wherein the mode register associated with the first CTAT current generator is configured to store the state of the control signals when the first current is substantially equal to the second current at the high temperature.

10. The temperature sensor of claim 4, further comprising a plurality of fusible links, each fusible link to set a state of one of the control signals of the first CTAT current generator and the second CTAT current generator.

11. The temperature sensor of claim 4, wherein the control signals for the second CTAT current generator are set such that an absolute value of a difference between a sum of the first current and the third current at the high temperature and a sum of the first current and the third current at a low temperature is substantially at a minimum.

12. The temperature sensor of claim 11, wherein the state of the control signals for the second CTAT current generator when the absolute value of the difference is substantially at the minimum are stored in a mode register.

13. The temperature sensor of claim 11, wherein the state of the control signals for the second CTAT current generator when the absolute value of the difference is substantially at the minimum are set in a plurality of fusible links.

14. The temperature sensor of claim 2, wherein the current combiner further comprises:
   a current mixer configured to generate a fifth current by summing the first current and the third current; and
   a current multiplier configured to generate the fourth current by scaling the fifth current in response to a plurality of control signals.

15. The temperature sensor of claim 14, wherein the current mixer comprises:
   a first PMOS transistor having a source coupled to a power supply and a gate coupled to a gate of a PMOS transistor of the PTAT current generator;
   a second PMOS transistor having a source coupled to the power supply and a gate coupled to a gate of a PMOS transistor of the second CTAT current generator; and
   an NMOS transistor having a gate and a drain coupled to the drains of the first and second PMOS transistors, and a source coupled to the ground.

16. The temperature sensor of claim 14, wherein the current multiplier further comprises:

a first current multiplier configured to generate a sixth current by scaling the fifth current in response to a first subset of the control signals; and a second current multiplier configured to generate the fourth current by scaling the sixth current in response to a second subset of the control signals.

17. The temperature sensor of claim 16, wherein the first subset of control signals are set such that at a low temperature, when the second subset of the control signals are set to scale the sixth current by a maximum amount, the second current is substantially equal to the first current plus the fourth current.

18. The temperature sensor of claim 16, wherein the first subset of control signals are set such that at a low temperature, when the second subset of the control signals are set to scale the sixth current by a maximum amount, the first current is substantially equal to the second current minus the fourth current.

19. The temperature sensor of claim 16, wherein the first current multiplier further comprises:

a PMOS transistor having a source coupled to a power supply, and a gate and a drain coupled to each other; and a current controller coupled between the drain of the PMOS transistor and a ground, the current controller configured to generate the sixth current in response to the fifth current and the first subset of the control signals.

20. The temperature sensor of claim 19, wherein the current controller further comprises:

a plurality of first NMOS transistors, each first NMOS transistor having a drain coupled to the drain of the PMOS transistor and a gate coupled to a gate of a NMOS transistor of the current mixer; and a plurality of second NMOS transistors, each second NMOS transistor coupled between a source of an associated one of the first NMOS transistors and the ground, and having a gate to receive one of the first subset of the control signals;

wherein any first NMOS transistor not coupled to an associated second NMOS transistor has a source coupled to the ground.

21. The temperature sensor of claim 20, wherein the first NMOS transistors have sizes such that a sum of currents through the first NMOS transistors is substantially proportional to a binary code on the first subset of the control signals.

22. The temperature sensor of claim 16, further comprising a plurality of fuses, each fuse to set a one of the first subset of the control signals.

23. The temperature sensor of claim 16, wherein the second current multiplier comprises:

a current controller coupled to a power supply, the second current multiplier configured to generate the fourth current in response to the sixth current and the second subset of the control signals; and an NMOS transistor having a gate and a drain coupled to the current controller and a source coupled to a ground.

24. The temperature sensor of claim 23, wherein the current controller comprises:

a plurality of first PMOS transistors having sources coupled to the power supply and gates coupled to a gate of a PMOS transistor of the first current multiplier; and a plurality of second PMOS transistors, each second PMOS transistor coupled between a drain of an associated one of the first PMOS transistors and the drain of the NMOS transistor, and having a gate to receive one of the second subset of the control signals.

25. The temperature sensor of claim 24, wherein the first PMOS transistors have sizes such that a sum of currents through the first PMOS transistors is substantially proportional to a binary code on the second subset of the control signals.

26. The temperature sensor of claim 2, wherein the current comparator further comprises:

a first comparator configured to compare the first current to a difference of the second current and the fourth current to generate a first current comparison; and a second comparator configured to compare the second current to a sum of the first current and the fourth current to generate a second current comparison.

27. The temperature sensor of claim 26, further comprising:

a differential amplifier to compare and amplify the first current comparison and the second current comparison in response to a temperature sensor enable signal to generate a differential output signal; and a latch configured to latch the differential output signal in response to an inverted temperature sensor enable signal and to output a signal related to the temperature.

28. The temperature sensor of claim 26, wherein the first comparator comprises:

a first PMOS transistor having a source coupled to a power supply and a gate coupled to a gate of a PMOS transistor of the PTAT current generator;

a second PMOS transistor having a source coupled to the power supply and a gate coupled to a gate of a PMOS transistor of the first CTAT current generator;

a first NMOS transistor having a drain coupled to the drain of the first PMOS transistor and a source coupled to a ground;

a second NMOS transistor having a source coupled to the ground, and a gate and a drain coupled to the drain of the second PMOS transistor and a gate of the first NMOS transistor; and a third NMOS transistor having a drain coupled to the drain of the second NMOS transistor, a source coupled to the ground, and a gate coupled to a gate of an NMOS transistor of the current combiner.

29. The temperature sensor of claim 26, wherein the second comparator comprises:

a first PMOS transistor having a source coupled to a power supply and a gate coupled to a gate of a PMOS transistor of the first CTAT current generator;

a second PMOS transistor having a source coupled to the power supply and a gate coupled to a gate of a PMOS transistor of the PTAT current generator;

a first NMOS transistor having a drain coupled to the drain of the first PMOS transistor and a source coupled to a ground;

the second NMOS transistor having a source coupled to the ground, and a gate and a drain coupled to the drain of the second PMOS transistor and a gate of the first NMOS transistor;

a third PMOS transistor having a source coupled to the power supply and a drain coupled to the drain of the second NMOS transistor;

a fourth PMOS transistor having a source coupled to the power supply, a gate and a drain coupled to a gate of the third PMOS transistor; and a third NMOS transistor having a drain coupled to the drain of the fourth PMOS transistor, a source coupled to the ground, and a gate coupled to a gate of an NMOS transistor of the current combiner.

30. The temperature sensor of claim 1, further comprising a power generator configured to supply power only for the temperature sensor.

31. A temperature detection method for a temperature sensor comprising:
- generating a first current proportional to temperature;
- generating a second current inversely proportional to temperature;
- generating a third current inversely proportional to temperature;
- adjusting the second current such that the first current is substantially equal to the second current at a high temperature;
- adjusting the third current such that a sum of the first current and the third current has a minimum deviation from a constant over temperature; and
- converting the first current, the second current, and the third current into a signal related to the temperature.

32. The temperature detection method of claim 31, wherein adjusting the second current further comprises:
- adjusting the second current using a plurality of control signals; and
- storing a state of the control signals.

33. The temperature detection method of claim 32, storing the state of the control signals further comprising storing the state of the control signals in a mode register.

34. The temperature detection method of claim 32, storing the state of the control signals further comprising fuse trimming a plurality of fuses to fix the state of the control signals.

35. The temperature detection method of claim 31, wherein adjusting the third current further comprises:
- adjusting the third current using a plurality of control signals; and
- storing a state of the control signals.

36. The temperature detection method of claim 35, storing the state of the control signals further comprising storing the state of the control signals in a mode register.

37. The temperature detection method of claim 35, storing the state of the control signals further comprising fuse trimming a plurality of fuses to fix the state of the control signals.

38. The temperature detection method of claim 31, wherein converting the first current, the second current, and the third current into the signal related to the temperature further comprises:
- generating a fourth current by summing the first current and the third current; and
- adjusting the fourth current such that the second current is substantially equal to the first current plus the fourth current at a low temperature;
- converting the first current, the second current, and the fourth current into the signal related to the temperature.

39. The temperature detection method of claim 38, wherein converting the first current, the second current, and the fourth current into the signal related to the temperature further comprises adjusting the fourth current using a plurality of second control signals until a comparison of the second current and a sum of the first current and the fourth current changes state.

40. The temperature detection method of claim 38, wherein adjusting the fourth current further comprises:
- adjusting the fourth current using a plurality of control signals; and
- storing a state of the control signals.

41. The temperature detection method of claim 40, storing the state of the control signals further comprising storing the state of the control signals in a mode register.

42. The temperature detection method of claim 40, storing the state of the control signals further comprising fuse trimming a plurality of fuses to fix the state of the control signals.

43. The temperature detection method of claim 31, wherein adjusting the third current further comprises adjusting the third current such that the third current has a gradient over temperature substantially equal to a gradient of the first current over temperature.

44. The temperature detection method of claim 31, wherein adjusting the third current further comprises:
- adjusting the third current using a plurality of control signals;
- measuring the sum at the high temperature with the control signals in a plurality of test states;
- measuring the sum at a low temperature with the control signals in the plurality of test states; and
- selecting one of the test states as the state of the control signals, the selected test state being a state where an absolute value of a difference between the fourth current at the high temperature in the selected state and the fourth current at the low temperature in the selected state is a minimum.

45. The temperature detection method of claim 31, wherein converting the first current, the second current, and the third current further comprises:
- summing the first current and the third current into a fourth current;
- scaling the fourth current into a fifth current in response to a plurality of first control signals;
- scaling the fifth current into a sixth current in response to a plurality of second control signals; and
- converting the first current, the second current, and the sixth current into the signal related to the temperature.

46. The temperature detection method of claim 45, wherein scaling the fourth current further comprises:
- selecting a plurality of transistors in response to the first control signals;
- for each selected transistor, generating a current contribution in response to the fourth current; and
- combining the current contributions of the selected transistors into the fifth current.

47. The temperature detection method of claim 45, wherein scaling the fifth current further comprises:
- selecting a plurality of transistors in response to the second control signals;
- for each selected transistor, generating a current contribution in response to the fifth current; and
- combining the current contributions of the selected transistors into the sixth current.

48. The temperature detection method of claim 31, wherein converting the first current, the second current, and the third current into the signal related to the temperature further comprises:
- scaling a sum of the first current and the third current into a fourth current;
- generating a first comparison between the second current and a sum of the first current and the fourth current;
- generating a second comparison between the first current and a difference of the second current and the fourth current; and
- generating the signal related to the temperature by comparing the first comparison and the second comparison.

49. A temperature detection method for a semiconductor device comprising:
- generating a first current proportional to temperature;
- generating a second current inversely proportional to temperature;
- generating a third current inversely proportional to temperature; and
- converting the first current, the second current, and the third current into a signal related to the temperature;

wherein converting the first current, the second current, and the third current into the signal related to the temperature further comprises:
  generating a fourth current by summing the first current and the third current;
  generating a fifth current by scaling the fourth current; and
  converting the first current, the second current, and the fifth current into the signal related to the temperature.

50. The temperature detection method of claim 49, wherein converting the first current, the second current, and the fifth current into the signal related to the temperature further comprises:
  generating a first result by comparing the first current to a difference of the second current and the fifth current;
  generating a second result by comparing the second current to a sum of the first current and the fifth current; and
  generating the signal related to the temperature by comparing the first result and the second result.

51. The temperature detection method of claim 49, wherein generating the second current further comprises generating the second current in response to a plurality of control signals.

52. The temperature detection method of claim 51, further comprising setting the control signals in a state such that the first current and the second current are substantially equal at a high temperature.

53. The temperature detection method of claim 49, wherein generating the third current further comprises generating the third current in response to a plurality of control signals.

54. The temperature detection method of claim 53, further comprising setting the control signals in a state such that the fourth current versus temperature has a minimum deviation from a constant current versus temperature.

55. The temperature detection method of claim 49, wherein generating the fifth current further comprises:
  generating a sixth current by scaling the fourth current by a first factor; and
  generating the fifth current by scaling the sixth current by a second factor.

56. The temperature detection method of claim 55, further comprising setting the first factor in response to a plurality of control signals.

57. The temperature detection method of claim 55, further comprising setting the first factor such that the second current is substantially equal to a sum of the first current and the fifth current at a low temperature.

58. The temperature detection method of claim 49, further comprising adjusting the fifth current until a comparison of the second current and a sum of the first current and the fifth current changes state.

59. The temperature detection method of claim 58, further comprising adjusting a refresh rate of a semiconductor device according to the adjustment of the fifth current.

60. The temperature detection method of claim 58, wherein:
  adjusting the fifth current until the comparison changes state further comprises adjusting the fifth current at a first rate; and
  further comprising adjusting the fifth current at a second rate after the comparison changes state, wherein the first rate is faster than the second rate.

61. The temperature detection method of claim 58, wherein adjusting the fifth current further comprises adjusting the fifth current by one unit.

62. The temperature detection method of claim 58, further comprising providing a state of the adjustment of the fifth current as a sensed temperature.

* * * * *

UNITED STATES PATENT AND TRADEMARK OFFICE
CERTIFICATE OF CORRECTION

PATENT NO. : 7,532,056 B2
APPLICATION NO. : 11/459312
DATED : May 12, 2009
INVENTOR(S) : Young-Hun Seo It is certified that error appears in the above-identified patent and that said Letters Patent is hereby corrected as shown below:

Column 4, line 25, the word "diffierential" should read -- differential --;
Column 5, line 7, the word "Peode[0:n]" should read -- Pcode[0:n] --;
Column 6, line 31, the words "51 0" should read -- 510 --;
Column 11, line 31, the word "First" should read -- first --;
Column 15, line 61, the word "Alter" should read -- After --;
Column 16, line 38, the word "1524," should read -- 1524. --;
Column 18, line 30, the word "Peode[0:4]" should read -- Pcode[0:4] --.

Signed and Sealed this

Fifteenth Day of September, 2009

David J. Kappos
*Director of the United States Patent and Trademark Office*